(12) United States Patent
Hirasawa et al.

(10) Patent No.: US 11,335,173 B2
(45) Date of Patent: May 17, 2022

(54) TRACKING ASSISTANCE DEVICE, TRACKING ASSISTANCE SYSTEM, AND TRACKING ASSISTANCE METHOD

(71) Applicant: PANASONIC INTELLECTUAL PROPERTY MANAGEMENT CO., LTD., Osaka (JP)

(72) Inventors: Sonoko Hirasawa, Kanagawa (JP); Takeshi Fujimatsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 853 days.

(21) Appl. No.: 16/074,255

(22) PCT Filed: Nov. 16, 2016

(86) PCT No.: PCT/JP2016/004898
§ 371 (c)(1),
(2) Date: Jul. 31, 2018

(87) PCT Pub. No.: WO2017/134712
PCT Pub. Date: Aug. 10, 2017

(65) Prior Publication Data
US 2021/0174652 A1 Jun. 10, 2021

(30) Foreign Application Priority Data

Feb. 5, 2016 (JP) .............................. JP2016-020891

(51) Int. Cl.
*G08B 13/196* (2006.01)
*G06V 20/40* (2022.01)

(52) U.S. Cl.
CPC ....... *G08B 13/19608* (2013.01); *G06V 20/46* (2022.01); *G08B 13/1968* (2013.01); *G08B 13/19682* (2013.01)

(58) Field of Classification Search
CPC ................................................ G08B 13/19608
(Continued)

(56) References Cited

U.S. PATENT DOCUMENTS 8,891,821 B2 11/2014 Sato
9,779,308 B2 10/2017 Kuwahara et al.
(Continued)

FOREIGN PATENT DOCUMENTS

JP 5506990 3/2014

OTHER PUBLICATIONS

International Search Report (ISR) from International Searching Authority (Japan Patent Office) in International Pat. Appl. No. PCT/JP2016/004898, dated Jan. 31, 2017.

*Primary Examiner* — Daniel T Tekle
(74) *Attorney, Agent, or Firm* — Greenblum & Bernstein, P.L.C.

(57) ABSTRACT

Tracking assistance to reduce a burden on a monitoring person, includes search condition setter setting a search condition by user operation, tracking target setter setting, as a tracking target, a person designated by monitoring person's operation to select a tracking mark on a tracking target search screen displaying a video conforming to the search condition, confirmation video presentor displaying tracking target confirmation screen displaying video of a person having a highest possibility of being the tracking target from each camera as a confirmation video, video display period setter that in a case where the tracking mark is not displayed in the tracking target on the tracking target search screen, sets a video display period by the user's operation, and in-camera tracking information corrector correcting the tracking information to display the confirmation video on the tracking target confirmation screen based on the video display period.

11 Claims, 18 Drawing Sheets

(58) Field of Classification Search
USPC .......................................................... 382/103
See application file for complete search history.

(56) References Cited

U.S. PATENT DOCUMENTS

| | | | |
|---|---|---|---|
| 2015/0016798 A1* | 1/2015 | Fujimatsu | G11B 27/30 386/223 |
| 2015/0146921 A1* | 5/2015 | Ono | H04N 7/18 382/103 |
| 2017/0337698 A1 | 11/2017 | Ueda et al. | |
| 2018/0033153 A1 | 2/2018 | Hirasawa et al. | |
| 2018/0139416 A1 | 5/2018 | Hirasawa et al. | |

* cited by examiner

TRACKING ASSISTANCE DEVICE, TRACKING ASSISTANCE SYSTEM, AND TRACKING ASSISTANCE METHOD

TECHNICAL FIELD

The present disclosure relates to a tracking assistance device, a tracking assistance system, and a tracking assistance method, which each displays on a display device, a video from each of a plurality of cameras which is accumulated in video accumulation means and assists a monitoring person's work of tracking a moving object which is a tracking target.

BACKGROUND ART

A monitoring system in which a plurality of cameras are installed in a monitoring area and a monitoring screen for displaying a video from each of the plurality of cameras is displayed on a monitor so as to be monitored by a monitoring person has been widely spread. In such a monitoring system, videos from the cameras are recorded in a recorder, so a monitoring person can check what types of actions a person, who performed a problematic action such as shoplifting, performs in the monitoring area.

In this way, in a case where a monitoring person tracks the action of a person while viewing the monitoring screen, as the person moves in the monitoring area, the cameras capturing the person are switched one after another, so that it is required to sequentially check the video from each of the cameras. At this time, if the monitoring person selects the camera one by one and checks the video, it becomes a very troublesome task. Therefore, if the videos from cameras, in which the person who is the tracking target is captured, are sequentially displayed with the lapse of time, it is possible to efficiently perform the work of tracking the action of the person.

As such a technology of efficiently performing the work of tracking the action of a person, in the related art, a technology has been known in which if a monitoring person designates a date and time and a camera, finds a video in which a person who is a tracking target is captured, and designates the person who is the tracking target, a tracking target confirmation screen is displayed which allows the monitoring person to check whether or not there is an error in tracking information regarding the designated person, and if it is checked that there is no error in the tracking information, videos from respective cameras, in which the person who is the tracking target is captured, are continuously played back, based on the tracking information, with the lapse of time (see PTL 1).

CITATION LIST

Patent Literature

PTL 1: Japanese Patent No. 5506990

SUMMARY OF THE INVENTION

According to the present disclosure, there is provided a tracking assistance device that displays on a display device, a video from each of a plurality of cameras which is accumulated in video accumulation means and assists a monitoring person's work of tracking a moving object which is a tracking target, the device including a search condition setter that sets a search condition for finding out a video of the moving object which is a tracking target, in response to a user's operation input; a tracking target setter that acquires a video conforming to the search condition from the video accumulation means to display a tracking target search screen on the display device, and in response to a monitoring person's operation input of designating the moving object which is the tracking target, by an operation of selecting a tracking mark displayed on the video on the tracking target search screen, sets the designated moving object as the tracking target; a confirmation video presentor that extracts for each of the cameras, a video of a moving object having a highest possibility of being the moving object set as the tracking target, based on tracking information acquired in a tracking process executed on the videos accumulated in the video accumulation means, and displays on the display device, a tracking target confirmation screen in which only the extracted videos are displayed as confirmation videos; a video display period setter that in a case where the tracking mark is not displayed on the moving object which is the tracking target on the tracking target search screen, sets a video display period during which the moving object which is set as the tracking target appears in the video, in response to the user's operation input; and a tracking information corrector that corrects the tracking information so as to display the confirmation video on the tracking target confirmation screen based on the video display period.

According to the present disclosure, in a case where a tracking mark is not displayed on a moving object which is a tracking target, that is, in a case where the moving object which is the tracking target cannot be tracked, instead of selecting the tracking mark to designate the moving object which is the tracking target, a user designates a video display period of the moving object which is the tracking target, so even in a case where the moving object which is the tracking target cannot be tracked in a certain camera, a confirmation video for the camera can be properly displayed on a tracking target confirmation screen. Thus, regardless of the result of in-camera tracking, an assistance process to reduce a burden on a monitoring person is appropriately performed, which makes it possible to follow a tracking work smoothly, without losing the sight of the person being tracked.

DESCRIPTION OF EMBODIMENT

Figure 1:
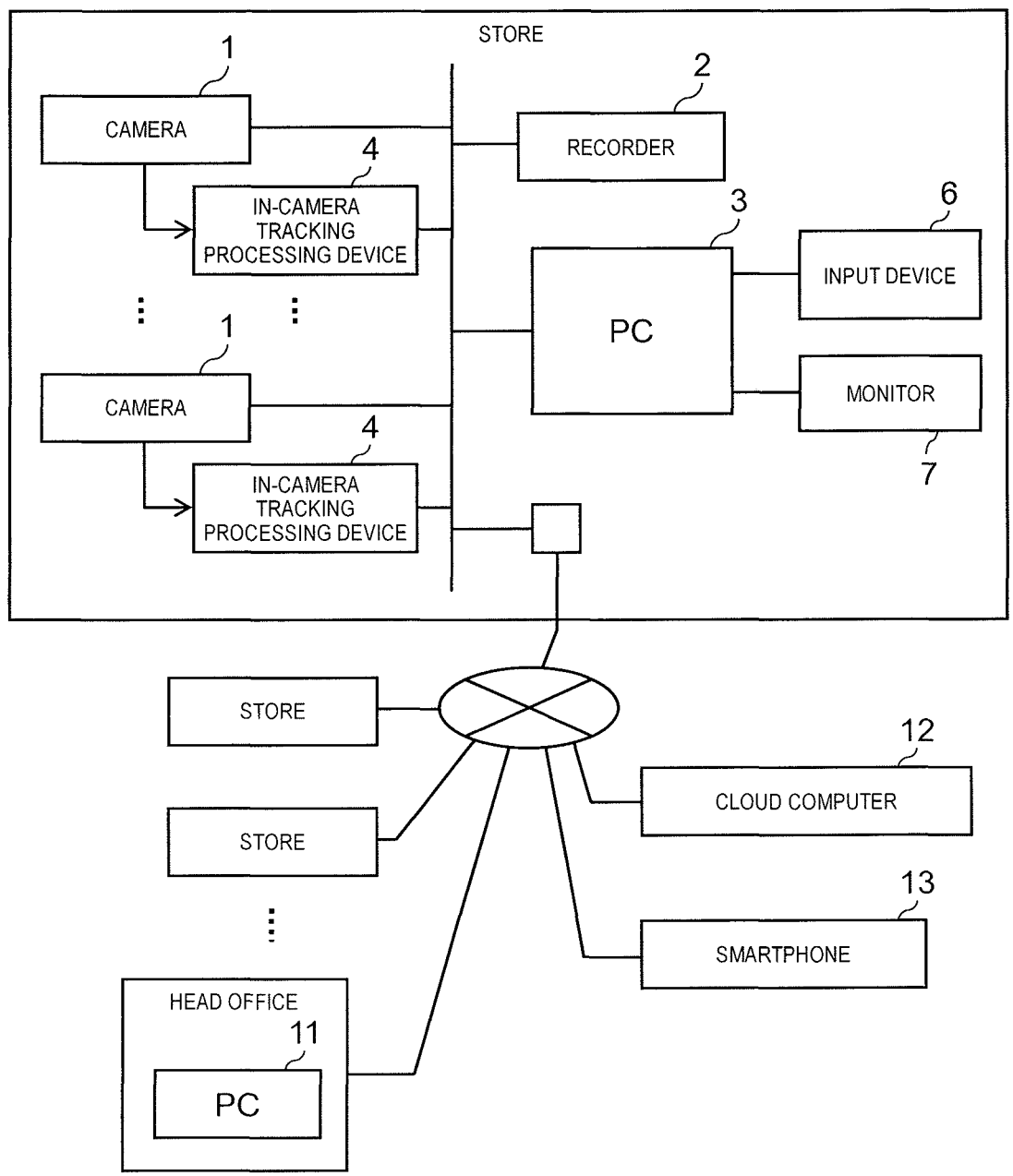
FIG. 1 is an overall configuration diagram of a tracking assistance system according to a present exemplary embodiment.

Prior to the description of the embodiments of the present invention, a brief description will be given on problems in the related art. In the related art, in a person search for finding out a person who is a tracking target from a video from a camera at a date and time of interest, the person who is the tracking target is designated by selecting a person frame displayed on the video. However, in a crowded environment or the like, person detection may fail in the in-camera tracking, and no person frame is displayed on the person whose person detection fails, so even if a person who is a tracking target is captured in a video, the person may not be designated as the tracking target. In this case, since a transition cannot be made to the tracking target confirmation screen, the video in which a person frame is displayed on the person who is the tracking target is found out only by changing the camera or the date and time, so it is necessary to perform a work requiring time and effort.

By playing back the video of the period form when a person who is a tracking target appears in a video to when the person disappears from the video, on the tracking target confirmation screen, based on the in-camera tracking information acquired by the in-camera tracking, it is possible to check the action of the person in the imaging area of a camera of interest without omission. However, if there is an error in in-camera tracking information, inconvenience occurs in which some videos of the person who is the tracking target are missing or a video in which the person who is the tracking target is not captured is displayed, and it is not possible to smoothly perform a work of checking the action of the person who is the tracking target.

Therefore, according to the present disclosure, an object is to provide a tracking assistance device, a tracking assistance system, and a tracking assistance method in which regardless of the result of in-camera tracking, an assistance process to reduce a burden on a monitoring person is appropriately performed, which makes it possible to follow a tracking work smoothly, without losing the sight of the person being tracked.

A first disclosure made to solve the problem is a tracking assistance device that displays on a display device, a video from each of a plurality of cameras which is accumulated in video accumulation means and assists a monitoring person's work of tracking a moving object which is a tracking target, and is configured to include a search condition setter that sets a search condition for finding out a video of the moving object which is a tracking target, in response to a user's operation input; a tracking target setter that acquires a video conforming to the search condition from the video accumulation means to display a tracking target search screen on the display device, and in response to a monitoring person's operation input of designating the moving object which is the tracking target, by an operation of selecting a tracking mark displayed on the video on the tracking target search screen, sets the designated moving object as the tracking target; a confirmation video presentor that extracts for each of the cameras, a video of a moving object having a highest possibility of being the moving object set as the tracking target, based on tracking information acquired in a tracking process executed on the videos accumulated in the video accumulation means, and displays on the display device, a tracking target confirmation screen in which only the extracted videos are displayed as confirmation videos; a video display period setter that in a case where the tracking mark is not displayed on the moving object which is the tracking target on the tracking target search screen, sets a video display period during which the moving object which is set as the tracking target appears in the video, in response to the user's operation input; and a tracking information corrector that corrects the tracking information so as to display the confirmation video on the tracking target confirmation screen based on the video display period.

According to this, in a case where a tracking mark is not displayed on a moving object which is a tracking target, that is, a moving object which is a tracking target cannot be tracked, instead of selecting the tracking mark to designate the moving object which is the tracking target, a user designates a video display period of the moving object which is the tracking target, so even in a case where the moving object which is the tracking target cannot be tracked in a certain camera, a confirmation video of the camera can be properly displayed on a tracking target confirmation screen. Thus, regardless of the result of in-camera tracking, an assistance process to reduce a burden on a monitoring person is appropriately performed, which makes it possible to follow a tracking work smoothly, without losing the sight of the person being tracked.

A second disclosure is configured in which the video display period setter displays on the tracking target search screen, a moveable operation portion in which a start time and an end time of the video display period are displayed respectively, and allows the user to perform an operation to adjust a range of the video display period by shifting the moveable operation portion.

According to this, since an operation to shift the moveable portions respectively indicating the start time and the end time of the video display period may be performed, the video display period can be quickly adjusted to an appropriate range.

A third disclosure is configured in which the video display period setter displays on the tracking target search screen, the video from the camera in such a manner that the display time thereof can be adjusted, and acquires a start time and an end time of the video display period by allowing the user to perform an operation to select a video in which the moving object which is the tracking target appears first and a video immediately before the moving object which is the tracking target disappears.

According to this, since videos respectively corresponding to the start time and the end time of the video display period are selected, the video display period can be accurately set to an appropriate range.

A fourth disclosure is a tracking assistance device that displays on a display device, a video from each of a plurality of cameras which is accumulated in video accumulation means and assists a monitoring person's work of tracking a moving object which is a tracking target, and is configured to include a confirmation video presenter that extracts for each of the cameras, a video of a moving object having a highest possibility of being the moving object set as the tracking target, based on tracking information acquired in a tracking process executed on the videos accumulated in the video accumulation means, and displays on the display device, a tracking target confirmation screen in which only the extracted videos are displayed as confirmation videos; a video display period setter that displays a tracking result editing screen on the display device in a case where there is excess or deficiency in the confirmation video for each camera displayed on the tracking target confirmation screen, and sets a video display period during which a moving object set as the tracking target appears in a video, in response to a user's operation input on the tracking result editing screen; and a tracking information corrector that corrects the tracking information so as to display the confirmation video on the tracking target confirmation screen based on the video display period.

According to this, in a case where there is excess or deficiency in the confirmation video, that is, there is an error in the in-camera tracking information, the user is allowed to designate the video display period of the moving object which is the tracking target, even in a case where the moving object which is the tracking target cannot be properly tracked in a certain camera, the confirmation video of the camera can be properly displayed on the tracking target confirmation screen. Thus, regardless of the result of in-camera tracking, an assistance process to reduce a burden on a monitoring person is appropriately performed, which makes it possible to follow a tracking work smoothly, without losing the sight of the person being tracked.

A fifth disclosure is configured in which the video display period setter displays a tracking period acquired in an in-camera tracking process for the video for each camera as an initial video display period on the tracking result editing screen, and allows the user to perform an operation to adjust the range of the video display period on the tracking result editing screen such that the initial video display period to be partly deleted or added.

According to this, the tracking period acquired by in-camera tracking is displayed as an initial video display period and the range of the video display period is adjusted by partially deleting or adding the initial video display period, so it is possible to easily adjust the video display period to an appropriate range.

A six disclosure is configured in which the video display period setter displays on the tracking result editing screen, a moveable operation portion in which a start time and an end time of the video display period are displayed respectively, and allows the user to perform an operation to adjust a range of the video display period by shifting the moveable operation portion.

According to this, since an operation to shift the moveable portions respectively indicating the start time and the end time of the video display period may be performed, the video display period can be quickly adjusted to an appropriate range.

A seventh disclosure is configured in which the video display period setter displays on the tracking result editing screen, the video from the camera in such a manner that the display time thereof can be adjusted, and acquires at least one of the start time or the end time of the video display period by allowing the user to perform an operation to select at least one of a video in which the moving object which is the tracking target appears first or a video immediately before the moving object which is the tracking target disappears.

According to this, since videos respectively corresponding to the start time and the end time of the video display period are selected, the video display period can be accurately set to an appropriate range.

An eighth disclosure is configured in which the video display period setter sets the video display period to include the tracking period of the selected moving object by allowing the user to perform an operation to select a tracking mark of the moving object which is the tracking target appearing in the video, on the tracking result editing screen.

According to this, in a case where the moving object which is the tracking target has been tracked as another moving object, it is possible to add a tracking period during which the moving object which is the tracking target has been tracked as another moving object to a video display period by selecting the tracking mark of the moving object, so the video display period can be easily adjusted to an appropriate range.

A ninth disclosure is configured to further include a video playback device that displays on the display device, a continuous playback screen in which a moving object set as the tracking target, and a video from each of the cameras related to a moving object associated as the same as the moving object are arranged and displayed in order of imaging time, and performs continuous playback in which the video from each camera is sequentially displayed as a moving image with the lapse of time, on the continuous playback screen.

According to this, since the moving object which is the tracking target can be tracked continuously, the monitoring person can easily check what action the moving object which is the tracking target performs in the monitoring area.

A tenth disclosure is a tracking assistance system that displays on a display device, a video from each of a plurality of cameras which is accumulated in video accumulation means and assists a monitoring person's work of tracking a moving object which is a tracking target, and includes the camera that captures an image of a monitoring area; the display device that displays a video from each of the cameras; and a plurality of information processing devices, in which one of the plurality of information processing devices includes a search condition setter that sets a search condition for finding out a video of the moving object which is a tracking target, in response to a user's operation input; a tracking target setter that acquires a video conforming to the search condition from the video accumulation means to display a tracking target search screen on the display device, and in response to a monitoring person's operation input of designating the moving object which is the tracking target, by an operation of selecting a tracking mark displayed on the video on the tracking target search screen, sets the designated moving object as the tracking target; a confirmation video presenter that extracts for each of the cameras, a video of a moving object having a highest possibility of being the moving object set as the tracking target, based on tracking information acquired in a tracking process executed on the videos accumulated in the video accumulation means, and displays on the display device, a tracking target confirmation screen in which only the extracted videos are displayed as confirmation videos; a video display period setter that in a case where the tracking mark is not displayed on the moving object which is the tracking target on the tracking target search screen, sets a video display period during which the moving object which is set as the tracking target appears in the video, in response to the user's operation input; and a tracking information corrector that corrects the tracking information so as to display the confirmation video on the tracking target confirmation screen based on the video display period.

According to this, similarly to the first disclosure, regardless of the result of in-camera tracking, an assistance process to reduce a burden on a monitoring person is appropriately performed, which makes it possible to follow a tracking work smoothly, without losing the sight of the person being tracked.

An eleventh disclosure is a tracking assistance system that displays on a display device, a video from each of a plurality of cameras which is accumulated in video accumulation means and assists a monitoring person's work of tracking a moving object which is a tracking target, and includes a camera that captures an image of a monitoring area; the display device that displays a video from each of the cameras; and a plurality of information processing devices, in which one of the plurality of information processing devices includes a confirmation video presentor that extracts for each of the cameras, a video of a moving object having a highest possibility of being the moving object set as the tracking target, based on tracking information acquired in a tracking process executed on the videos accumulated in the video accumulation means, and displays on the display device, a tracking target confirmation screen in which only the extracted videos are displayed as confirmation videos; a video display period setter that displays a tracking result editing screen on the display device in a case where there is excess or deficiency in the confirmation video for each camera displayed on the tracking target confirmation screen, and sets a video display period during which a moving object set as the tracking target appears in a video, in response to a user's operation input on the tracking result editing screen; and a tracking information corrector that corrects the tracking information so as to display the confirmation video on the tracking target confirmation screen based on the video display period.

According to this, similarly to the fourth disclosure, regardless of the result of in-camera tracking, an assistance process to reduce a burden on a monitoring person is appropriately performed, which makes it possible to follow a tracking work smoothly, without losing the sight of the person being tracked.

A twelfth disclosure is a tracking assistance method, by an information processing device, of displaying on a display device, a video from each of a plurality of cameras which is accumulated in video accumulation means and assisting a monitoring person's work of tracking a moving object which is a tracking target, and the method includes setting a search condition for finding out a video of the moving object which is the tracking target, in response to a user's operation input; acquiring a video conforming to the search condition from the video accumulation means to display a tracking target search screen on the display device, and in response to a monitoring person's operation input of designating the moving object which is the tracking target, by an operation of selecting a tracking mark displayed on the video on the tracking target search screen, setting the designated moving object as the tracking target; extracting for each of the cameras, a video of a moving object having a highest possibility of being the moving object set as the tracking target, based on tracking information acquired in a tracking process executed on the videos accumulated in the video accumulation means, and displaying a tracking target confirmation screen in which only the extracted videos are displayed as confirmation videos, on the display device; setting a video display period during which the moving object which is set as the tracking target appears in the video, in response to the user's operation input, in a case where the tracking mark is not displayed on the moving object which is the tracking target on the tracking target search screen; and correcting the tracking information so as to display the confirmation video on the tracking target confirmation screen based on the video display period.

According to this, similarly to the first disclosure, regardless of the result of in-camera tracking, an assistance process to reduce a burden on a monitoring person is appropriately performed, which makes it possible to follow a tracking work smoothly, without losing the sight of the person being tracked.

A thirteenth disclosure is a tracking assistance method, by an information processing device, of displaying on a display device, a video from each of a plurality of cameras which is accumulated in video accumulation means and assisting a monitoring person's work of tracking a moving object which is a tracking target, and the method includes extracting for each of the cameras, a video of a moving object having a highest possibility of being the moving object set as the tracking target, based on tracking information acquired in a tracking process executed on the videos accumulated in the video accumulation means, and displaying a tracking target confirmation screen in which only the extracted videos are displayed as confirmation videos, on the display device; displaying a tracking result editing screen on the display device in a case where there is excess or deficiency in the confirmation video for each camera displayed on the tracking target confirmation screen, and setting a video display period during which a moving object set as the tracking target appears in a video, in response to a user's operation input on the tracking result editing screen; and correcting the tracking information so as to display the confirmation video on the tracking target confirmation screen based on the video display period.

According to this, similarly to the fourth disclosure, regardless of the result of in-camera tracking, an assistance process to reduce a burden on a monitoring person is appropriately performed, which makes it possible to follow a tracking work smoothly, without losing the sight of the person being tracked.

Hereinafter, exemplary embodiments of the present disclosure will be described with reference to the drawings. In the description of the present exemplary embodiment, two separate Japanese terms having the same meaning of tracking are used. Although they are merely used for convenience of explanation, and they are distinguished depending on usage related to a monitoring person's behavior and usage related to the processes performed on devices.

FIG. 1 is an overall configuration diagram of a tracking assistance system according to a present exemplary embodiment. The tracking assistance system is constructed for a retail store such as a supermarket and a home center, and includes camera 1, recorder (video accumulation means) 2, PC (tracking assistance device) 3, and in-camera tracking processing device 4.

Camera 1 is installed at an appropriate place in the store, and the inside of the store (monitoring area) is imaged by camera 1, and the videos of the interior of the store captured by camera 1 are recorded in recorder 2.

PC 3 is connected with input device 6 such as a mouse with which a monitoring person (user) performs various input operations and monitor (display device) 7 that displays a monitoring screen. PC 3 is installed in a security room or the like of a store, and a monitoring person (security guard) can view the videos of the interior of the store captured by camera 1 in real time on a monitor screen displayed on monitor 7, and view the past videos of the interior of the store recorded in recorder 2.

A monitor not shown in FIG. 1 is also connected to PC 11 provided in the head office, displays the videos of the interior of the store captured by camera 1 in real time, and displays the past videos of the interior of the store recorded in recorder 2, which allows a user at the head office to check the situation in the store.

In-camera tracking processing device 4 performs a process of tracking a person (moving object) detected from the video from camera 1 and generating in-camera tracking information for each person. For the in-camera tracking process, known image recognition techniques (such as a person detection technique and a person tracking technique) may be used.

In the present exemplary embodiment, in-camera tracking processing device 4 is configured to constantly perform an in-camera tracking process independently of PC 3, but may perform the tracking process in response to an instruction from PC 3. It is desirable that in-camera tracking processing device 4 performs the tracking process for all people detected from the video, but the tracking process may be performed by focusing on the person designated as the tracking target and a person highly relevant to the person.

Figure 2:
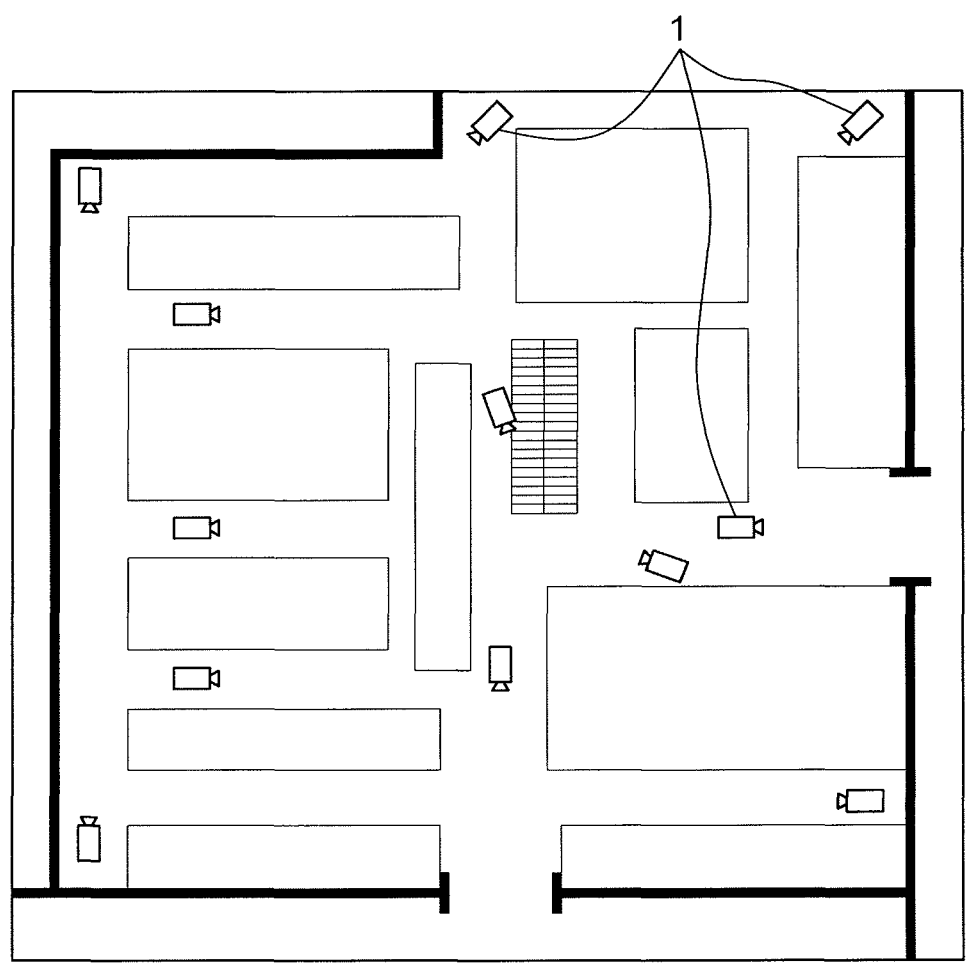
FIG. 2 is a plan view showing an installation situation of camera 1 in a store.

Next, the installation situation of camera 1 in the store will be described. FIG. 2 is a plan view showing the installation situation of camera 1 in the store.

In the store (monitoring area), a passage is provided between commodity display spaces, and a plurality of cameras 1 are installed so as to mainly image the passage.

When a person moves in a passage in the store, the person is imaged by one or more of cameras 1, and in accordance with the movement of the person, imaging of the person is handed over to next camera 1. At this time, a camera that takes over the imaging of a person is limited by the form of the passage in the store and the imaging area of camera 1, and in the present exemplary embodiment, the camera that takes over the imaging of a person is referred to as a camera having a cooperation relationship. Information on the cooperation relationship of the camera is set in advance, and is held in PC 3 as camera cooperation information. The information on the cooperation relationship of the cameras is prepared for a change in the number of cameras 1 and the installation locations thereof, or the like, the installation information of each camera 1 may be individually acquired by PC 3 at the time of starting the system, and the information on the cooperation relationship of the respective cameras may be updated.

Figure 3:
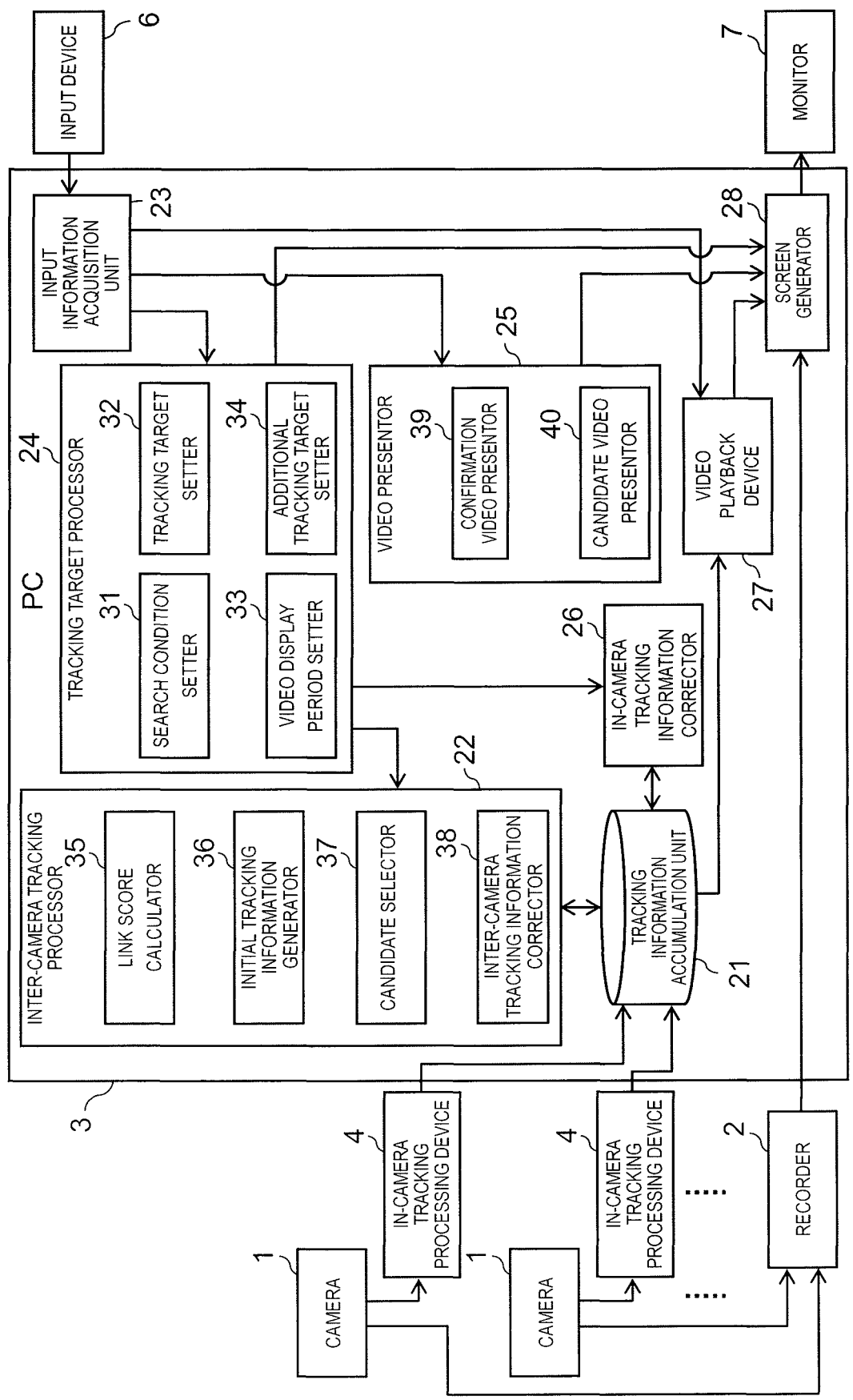
FIG. 3 is a functional block diagram of PC 3.

Next, a schematic configuration of PC 3 will be described. FIG. 3 is a functional block diagram illustrating a schematic configuration of PC 3.

PC 3 includes tracking information accumulation unit 21, inter-camera tracking processor 22, input information acquisition unit 23, tracking target processor 24, video presenter 25, in-camera tracking information corrector 26, video playback device 27, and screen generator 28.

The in-camera tracking information generated by in-camera tracking processing device 4 is accumulated in tracking information accumulation unit 21. The inter-camera tracking information generated by inter-camera tracking processor 22 is accumulated in tracking information accumulation unit 21.

Input information acquisition unit 23 performs a process of acquiring input information based on an input operation, in response to the input operation by a monitoring person using input device 6 such as a mouse.

Tracking target processor 24 includes search condition setter 31, tracking target setter 32, video display period setter 33, and additional tracking target setter 34.

Search condition setter 31 performs a process of setting a search condition for finding out a video in which a person who is a tracking target is captured, in response to an input operation of a monitoring person. In the present exemplary embodiment, the person search screen (tracking target search screen, see FIG. 7) is displayed on monitor 7, and the person search screen allows a monitoring person to input information on the photographing date and time and camera 1 as the search condition on the person search screen.

Tracking target setter 32 performs a process of displaying on the person search screen, the video of the date and time and camera 1 conforming to the search condition, from among videos accumulated in recorder 2, based on the search condition set by search condition setter 31 and the in-camera tracking information accumulated in tracking information accumulation unit 21, causing the monitoring person to select the person frame (tracking mark) on the person search screen to designate the person who is the tracking target, and setting the designated person as the tracking target.

Inter-camera tracking processor 22 includes link score calculator 35, initial tracking information generator 36, candidate selector 37, and inter-camera tracking information corrector 38.

Link score calculator 35 acquires the in-camera tracking information on each camera 1 from tracking information accumulation unit 21, and calculates a link score (evaluation value) representing a high possibility that the persons who are detected and tracked in the in-camera tracking process of each camera 1 can be the same person. In this process, the link score is calculated based on the detection time of the person (the imaging time of the frame), the detection position of the person, the movement speed of the person, the color information of the person image, and the like.

Initial tracking information generator 36 performs a process of sequentially selecting for each camera 1, a person having the highest link score, that is, having a highest possibility of being the same person, with the person set as the tracking target by tracking target setter 32 as a starting point, from among the persons tracked by the in-camera tracking of camera 1 which is in the cooperation relationship, and generating initial tracking information in which those persons are associated as the same person.

Specifically, first, a person having the highest link score is selected from among the persons who are tracked by in-camera tracking of camera 1 which is in the cooperation relationship with camera 1 that captures an image (tracking target designating video) when the person is designated as the tracking target on the person search screen, and next, a person having the highest link score is selected from among the persons who are tracked by in-camera tracking of camera 1 which is in the cooperation relationship with camera 1 that captures the selected person. Such a person selection process is repeated for each camera 1 which is in a cooperation relationship. Such a person selection process is performed both before and after the tracking target designating video temporally, and when the highest link score becomes equal to or less than a predetermined threshold, it is determined that there is no person set as the tracking target in the monitoring area, and the selection of a person is ended.

Video presenter 25 includes confirmation video presenter 39 and candidate video presenter 40.

Confirmation video presenter 39 performs a process of extracting the video of the person having the highest link score, that is, the video having the highest possibility of showing the person who is the tracking target as a confirmation video for each camera 1, based on the initial tracking information generated by initial tracking information generator 36, and presenting the confirmation video, specifically, displaying a timeline screen in a confirmation video display state (a tracking target confirmation screen, see FIG. 8) in which confirmation videos are arranged and displayed in order of imaging time, on monitor 7.

Candidate selector 37 of inter-camera tracking processor 22 performs a process of selecting a predetermined number of people whose link score is lower than the person corresponding to the confirmation video having an error, as a candidate person from the top, from among the people who are tracked by in-camera tracking during a period corresponding to the confirmation video with an error, in a case where there is an error in the confirmation video presented by confirmation video presenter 39, that is, there is an error in the initial tracking information generated by initial tracking information generator 36.

At this time, a candidate person whose link score is equal to or higher than a predetermined threshold and whose tracking period is included in the search period which is set based on the tracking period (the period traced by the in-camera tracking) of the person corresponding to the confirmation video selected as having an error is selected. Incidentally, the setting information on the threshold of the link score and the time width for setting the search period are retained in the setting information holding unit (not shown) of PC 3.

Candidate video presenter 40 performs a process of extracting as a candidate video, a video related to the candidate person selected by candidate selector 37, that is, a video having a next highest possibility of the confirmation video that a person who is the tracking target is captured, and presenting the candidate video, in a case where there is an error in the confirmation video presented by confirmation video presenter 39, specifically, a process of displaying on monitor 7, a timeline screen (a candidate selection screen, see FIG. 10) in a candidate video display state in which a predetermined number of candidate videos are displayed, and causing a candidate video in which the person who is the tracking target is captured to be selected by the monitoring person on the screen.

Inter-camera tracking information corrector 38 performs a process of correcting the tracking information on the person set as the tracking target such that the person corresponding to the candidate video is associated with the person set as the tracking target and generating the corrected tracking information, when there is an appropriate candidate video among the candidate videos presented by candidate video presenter 40.

At this time, similarly to the process of generating the initial tracking information, inter-camera tracking information corrector 38 sequentially selects for each camera 1, a person having the highest link score, that is, having a highest possibility of being the same person, starting from the person corresponding to the candidate video, from among the persons tracked by the in-camera tracking of camera 1 which is in the cooperation relationship, and generates corrected tracking information in which those persons are associated as the same person. In the tracking information correction process, the person set by tracking target setter 32, the person corresponding to the confirmation video for which confirmation operation was performed by the monitoring person, and the person corresponding to the candidate video replaced with the confirmation video already having an error are excluded from the correction target.

Additional tracking target setter 34 of tracking target processor 24 performs a process of displaying on monitor 7, a person search screen (a tracking target search screen, see FIG. 7) in which videos accumulated in recorder 2 are displayed, when there is no appropriate candidate video among candidate videos presented by candidate video presenter 40, causing a person set as a tracking target to be designated by the monitoring person, from among the videos during a period corresponding to the confirmation video with an error, on the person search screen, and additionally setting the designated person as an additional tracking target.

Inter-camera tracking information corrector 38 performs a process of associating the person set as the tracking target by additional tracking target setter 34 with the person set as the tracking target by tracking target setter 32, correcting tracking information on a person set as the tracking target, and generating corrected tracking information.

Figure 7:
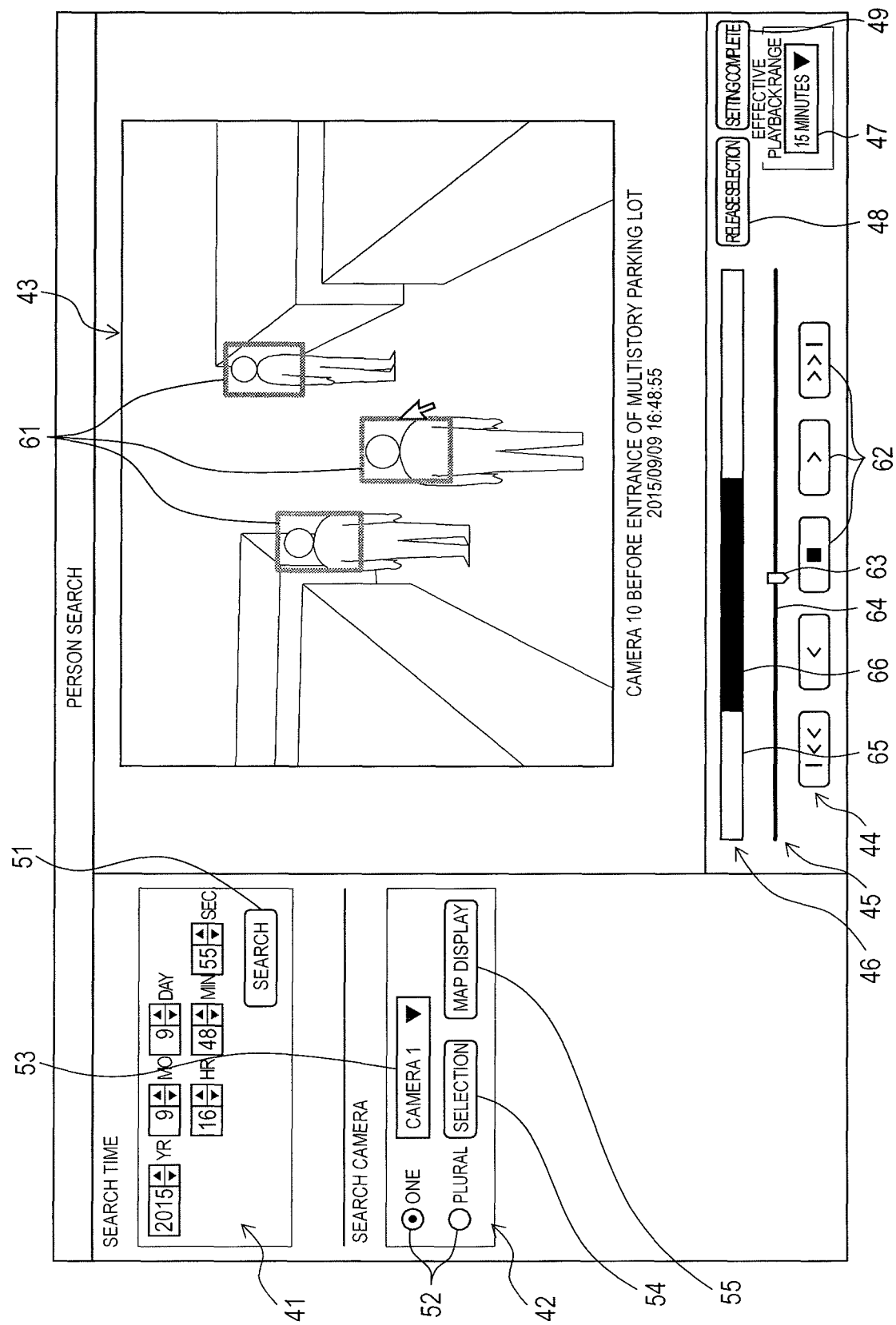
FIG. 7 is an explanatory diagram illustrating a person search screen displayed on monitor 7.

Video display period setter 33 of tracking target processor 24 performs a process of setting a video display period during which a person who is the tracking target appears in the video, in response to the operation input by the monitoring person, in a case where a person frame is not displayed on the person who is a tracking target on the person search screen (tracking target search screen, see FIG. 7).

Video display period setter 33 performs a process of displaying a tracking result editing screen (see FIG. 12) on monitor 7, in response to the operation by the monitoring person instructing tracking result editing, in a case where there is excess or deficiency in a confirmation video for each camera 1 displayed on the timeline screen (tracking target confirmation screen, see FIG. 8) in the confirmation video display state, and setting a video display period during which the person who is the tracking target appears in the video, in response to an operation input by the user on the tracking result editing screen.

Video display period setter 33 performs a process of displaying on monitor 7, a person search screen in which videos accumulated in recorder 2 are displayed, when there is no appropriate candidate video among candidate videos presented by candidate video presenter 40, causing the monitoring person to designate a period during which the person who is the tracking target is captured in the video on the person search screen, and setting the period as a video display period.

In-camera tracking information corrector 26 performs correction of adding the video display period set by video display period setter 33 to the tracking information on the person set as the tracking target, and generating corrected tracking information. Therefore, the in-camera tracking information includes the tracking period and the video display period.

In a case where the video display period is set by video display period setter 33 and the confirmation video of camera 1 adjacent to camera 1 of which the video display period is set becomes a blank state (state in which video is not displayed) on the timeline screen, additional tracking target setter 34 of tracking target processor 24 performs a process of displaying on monitor 7, a person search screen (a tracking target search screen, see FIG. 7) in which videos accumulated in recorder 2 are displayed, and causing the monitoring person to designate a person set as a tracking target to be designated from among the videos during a period corresponding to the confirmation video in the blank state, on the person search screen, and additionally setting the designated person as a tracking target.

Video playback device 27 performs a process of displaying the video from camera 1 as a moving image on the screen displayed on monitor 7. In the present exemplary embodiment, a process of displaying the timeline screen in a continuous playback state (the continuous playback screen, see FIG. 9) on monitor 7 is performed, and on the timeline screen, continuous playback of sequentially displaying the video from each camera 1 in which the person who is the tracking target is captured as a moving image with the lapse of time is performed.

Screen generator 28 generates a screen to be displayed on monitor 7, specifically, generates a person search screen (tracking target search screen, see FIG. 7) in response to an instruction from tracking target setter 32, generates a timeline screen in a confirmation video display state (a tracking target confirmation screen, see FIG. 8) in response to an instruction from confirmation video presenter 39, generates a timeline screen in a candidate video display state (a candidate selection screen, see FIG. 10) in response to an instruction from candidate video presenter 40, and generates a timeline screen (a continuous playback screen, see FIG. 9) in the continuous playback state in response to an instruction from video playback device 27.

In addition, each unit of PC 3 shown in FIG. 3 is realized by causing a processor (CPU) of PC 3 to execute a tracking assistance program (instruction) stored in a memory such as an HDD. These programs may be installed in PC 3 which is an information processing device in advance and configured as a dedicated device, or may be provided to the user by being recorded in an appropriate program recording medium or through a network, as an application program operating on a predetermined OS.

Figure 4:
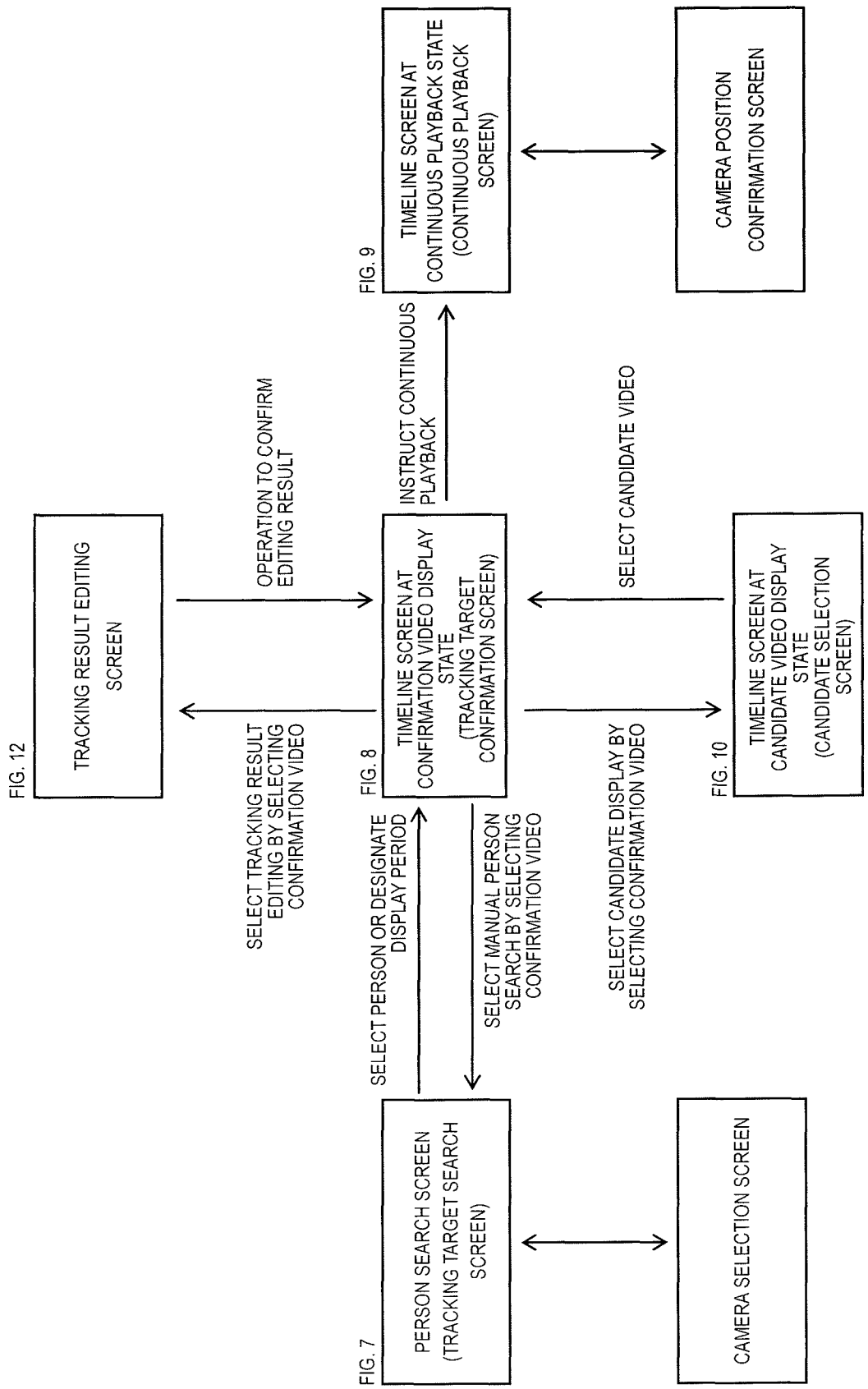
FIG. 4 is an explanatory diagram illustrating a person search screen displayed on monitor 7.
Figure 5:
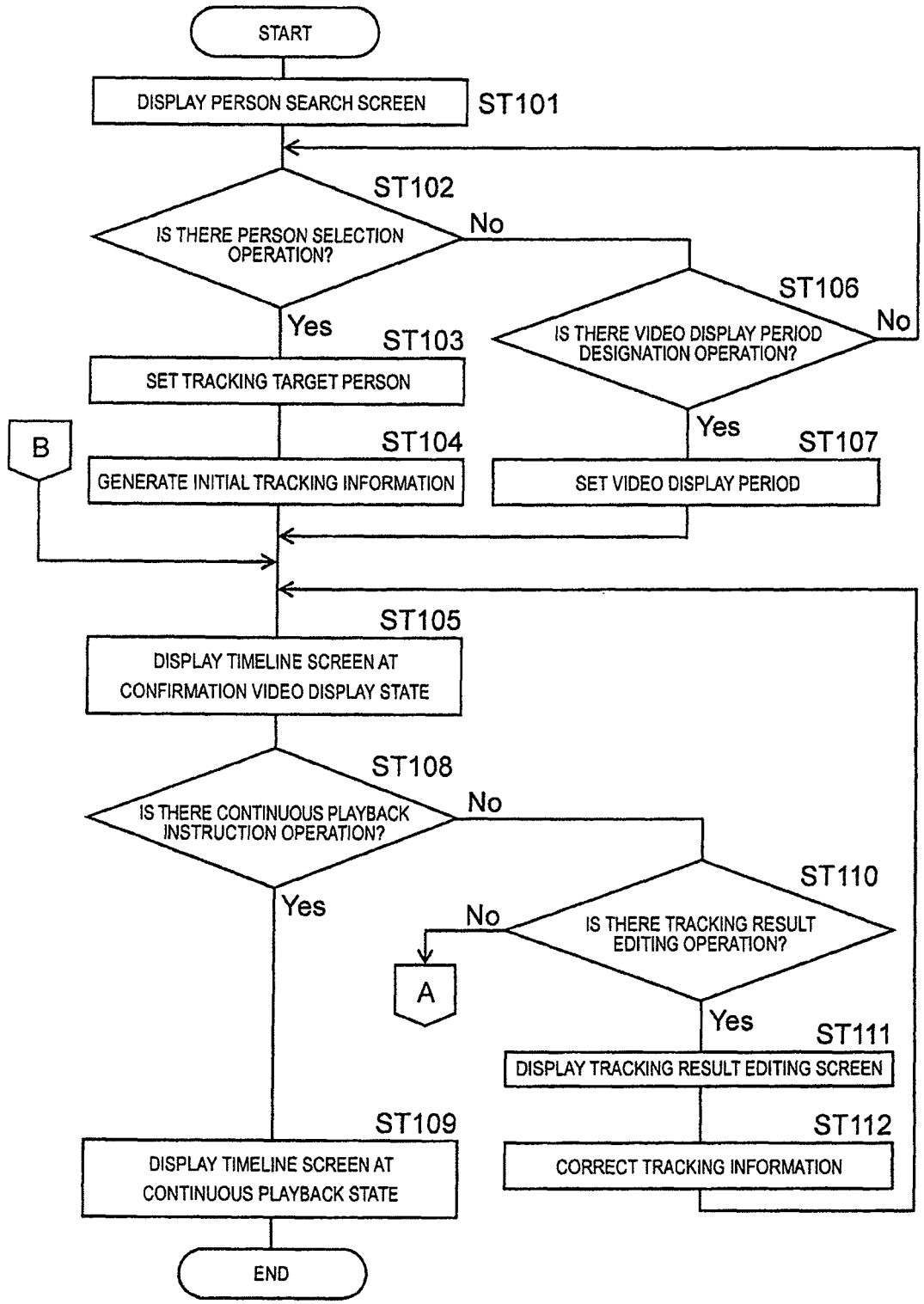
FIG. 5 is a flowchart showing a procedure of a process performed in each unit of PC 3 in response to an operation of a monitoring person performed on each screen.
Figure 6:
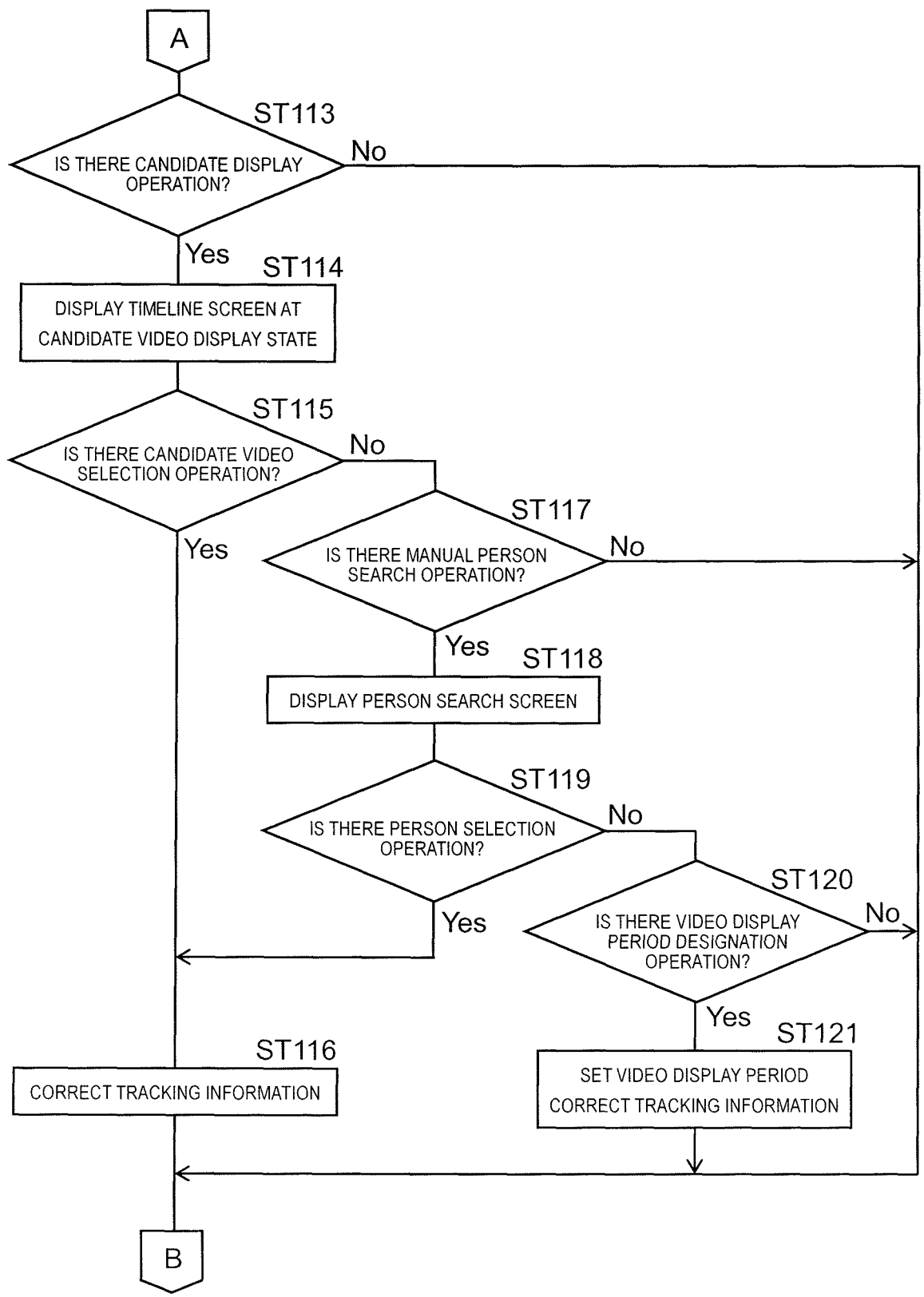
FIG. 6 is a flowchart showing a procedure of a process performed in each unit of PC 3 in response to an operation of a monitoring person performed on each screen.

Next, each screen displayed on monitor 7 and processes performed in each unit of PC 3 in response to the operation of the monitoring person performed on each screen will be described. FIG. 4 is an explanatory diagram illustrating a transition situation of a screen displayed on monitor 7. FIG. 5 and FIG. 6 are flowcharts showing a procedure of a process performed in each unit of PC 3 in response to the operation of the monitoring person performed on each screen.

First, when the operation to start the tracking assistance process is performed in PC 3, a person search screen (tracking target search screen, see FIG. 7) is displayed on monitor 7 (ST101).

The person search screen is used to designate the date and time when the person who is a tracking target performs a problematic action such as shoplifting, designate a place where the person desired to be tracked performs the problematic action, and camera 1 that captures an area through which the person is assumed to pass, find out the video in which the person who is the tracking target is captured, and designate the person who is the tracking target on the video. If the person who is the tracking target is captured in the video displayed by designating the date and time and camera 1, the monitoring person selects the person frame displayed on the person and designates the person as the tracking target (Yes in ST102).

The person search screen includes a person search screen by a single camera and a person search screen by plural cameras. The person search screen by a single camera displays a video from single camera 1 and is used to find out a video in which a person who is a tracking target is captured. The person search screen by plural cameras displays a video from plural cameras and is used to find out the video in which the person who is the tracking target is captured.

When a camera selection operation is performed on the person search screen, a transition is made to a camera selection screen (not shown). When camera 1 is selected on the camera selection screen, the screen returns to the person search screen, and the video from selected camera 1 is displayed on the person search screen.

The camera selection screen includes a single camera selection screen and a plural camera selection screen. On the single camera selection screen, the monitoring person can select one camera 1 to display the video on the person search screen. On the plural camera selection screen, the monitoring person can select plural cameras 1 to display the videos on the person search screen.

On the person search screen, when the monitoring person designates a person who is a tracking target, tracking target setter 32 performs a process of setting the person designated by the monitoring person to a tracking target (ST103). Next, initial tracking information generator 36 performs a process of sequentially selecting a person with the highest link score from the persons detected and tracked by the in-camera tracking process for each camera 1 for each camera and generating initial tracking information (ST104). Then, in confirmation video presenter 39, a process of extracting the video having the highest possibility of showing the person set as the tracking target as a confirmation video for each camera 1, based on the initial tracking information, and displaying a timeline screen (a tracking target confirmation screen, see FIG. 8) in the confirmation video display state in which the confirmation video is displayed, on monitor 7 is performed (ST105).

On the other hand, on the person search screen, in a case where a person who is a tracking target is not captured in the video displayed with the designated date and time and camera 1, it is not possible to perform an operation to select the person frame (No in ST 102), and instead thereof, an operation of designating a period (video display period) during which a person who is a tracking target appears in video is performed by the monitoring person (Yes in ST 106), and video display period setter 33 performs a process of setting the video display period (ST 107). Then, confirmation video presenter 39 performs a process of displaying on monitor 7 the timeline screen (see FIG. 11) at the confirmation video display state in which the video corresponding to the video display period is displayed as confirmation video (ST 105).

The timeline screen at the confirmation video display state is used to allow a monitoring person to check whether there is an error in inter-camera tracking information (initial tracking information) by using a confirmation video, and in a case where a monitoring person performs an operation of selecting a person frame on the person search screen and designating a person who is a tracking target, a confirmation video for each of cameras 1 before and after camera 1 for which the person who is the tracking target is designated is displayed by inter-camera tracking.

In a case where there is no error in all the confirmation videos displayed on the timeline screen in the confirmation video display state, that is, the person who is the tracking target is captured in all the confirmation videos and the person frame is displayed on the person, the operation of instructing the continuous playback is performed by the monitoring person (Yes in ST 108), and a transitions is made to the timeline screen (continuous playback screen, see FIG. 11) in the continuous playback state (ST109).

Continuous playback is performed in which the video from each camera 1 showing the tracking target is sequentially displayed with the lapse of time, on the timeline screen in the continuous playback state.

On the other hand, in a case where an inappropriate confirmation video is found among a plurality of confirmation videos displayed on the timeline screen in the confirmation video display state, that is, although a person who is a tracking target is captured in the confirmation video, when the confirmation video is played back, a video in which only the person who is not the tracking target is captured is displayed, a video in which the person who is the tracking target is captured is started from the middle, or a video in which the person who is the tracking target is captured is ended in the middle, so in a case where the person who is the tracking target is not appropriately captured, over a whole period from when the person who is the tracking target appears in the video to when the person disappears from the video, an operation of selecting the confirmation video and instructing the tracking result editing is performed by the monitoring person (Yes in ST 110). Then, video display period setter 33 performs a process for displaying the tracking result editing screen (see FIG. 12) on monitor 7 (ST 111).

On the tracking result editing screen, an editing operation of deleting an unnecessary part of the video display period and adding a missing part of the video display period is performed by the monitoring person. When the editing operation is completed, in-camera tracking information corrector 26 performs a process for correcting the in-camera tracking information, based on the input information by the editing operation, and if necessary, inter-camera tracking information corrector 38 performs a process for correcting the inter-camera tracking information, based on the in-camera tracking information (ST 112). Then, confirmation video presenter 39 performs a process of displaying the timeline screen in the confirmation video display state on monitor 7 (ST 105).

On the other hand, in a case where a confirmation video with an error is found among the plurality of confirmation videos displayed on the timeline screen in the confirmation video display state, that is, the person who is the tracking target is not captured in one of the confirmation videos, or the person who is the tracking target is captured but the person frame indicating the tracking target is displayed on a person different from the person set as the tracking target, an operation of selecting the confirmation video and instructing the display of the candidate video is performed by the monitoring person (Yes in ST113).

Then, candidate selector 37 performs a process of selecting a predetermined number of people whose link score is lower than the person corresponding to the confirmation video from the top, and candidate video presenter 40 performs a process of extracting the video of a person selected as a candidate video by candidate selector 37 and displaying a timeline screen (a candidate selection screen, see FIG. 10) in a candidate video display state in which the candidate videos are arranged and displayed, on monitor 7 (ST114).

A predetermined number of videos whose possibility of showing the person set as the tracking target is the next highest of the confirmation video are displayed as the candidate video in a descending order, on the timeline screen in the candidate video display state. In some cases, the person having the highest link score and the people after the next rank may be captured by the same camera 1, and the candidate video may be captured by the same camera 1 as that of the confirmation video.

In a case where there is an appropriate candidate video, among candidate videos displayed on the timeline screen in the candidate video display state, that is, a candidate video in which the person who is the tracking target is captured is found, and a person frame is displayed on the person, the monitoring person performs an operation of selecting the candidate video (Yes in ST115).

Then, inter-camera tracking information corrector 38 performs a process of correcting the tracking information such that the person corresponding to the candidate video selected on the timeline screen in the candidate video display state is associated with the person who is first designated as the tracking target (ST116). Then, the screen returns to the timeline screen in the confirmation video display state (ST105), and the result of correcting the tracking information is reflected, that is, the confirmation video of the timeline screen is replaced with the candidate video and the candidate video is displayed, on the timeline screen.

On the other hand, in a case where there is no appropriate candidate video, among candidate videos displayed on the timeline screen in the candidate video display state, that is, a candidate video in which the person who is the tracking target is captured is not found, or a candidate video in which the person who is the tracking target is captured is found but the person frame is not displayed on the person, the monitoring person performs an operation of selecting a manual person search (Yes in ST117), and a transition is made to a person search screen (a tracking target search screen, see FIG. 7) (ST118). The monitoring person designates date and time and camera 1 and finding out a video in which the person who is the tracking target is captured, on the person search screen.

In a case where a video in which the person who is the tracking target is captured is found and the person frame is displayed on the person, on the person search screen, that is, in a case where the in-camera tracking of the person who is the tracking target is successful, the monitoring person performs an operation of selecting the person frame (Yes in ST119). Then, inter-camera tracking information corrector 38 performs a process of correcting the tracking information such that the person selected on the person search screen is associated with the person who is first designated as the tracking target (ST116). Then, the screen returns to the timeline screen in the confirmation video display state (ST105), and the result of correcting the tracking information is reflected, that is, the confirmation video of the timeline screen is replaced with the video of the person designated on the person search screen, and the replaced video is displayed on the timeline screen.

On the other hand, in a case where a video in which the person who is the tracking target is captured is found but the person frame is not displayed on the person, on the person search screen, that is, the in-camera tracking for the person who is the tracking target is failed, the monitoring person performs an operation of designating a period during which the person who is the tracking target is captured in the video on the person search screen as a video display period (Yes in ST120). Then, video display period setter 33 performs a process of setting the video display period, and then inter-camera tracking information corrector 38 performs a correction to add the video display period to the tracking information on the person set as the tracking target (ST121). Then, the screen returns to the timeline screen in the confirmation video display state (ST105), and the result of correcting the tracking information is reflected, that is, the confirmation video of the timeline screen is replaced with the video of the video display period designated on the person search screen, and the replaced video is displayed on the timeline screen.

As described above, in a case where there is an inconvenience in the confirmation video displayed on the timeline screen in the confirmation video display state, the monitoring person performs an operation of entering the video display period during which the person who is the tracking target is captured in the video, an operation of designating a candidate video, or an operation of finding out and designating a person set as the tracking target, and these operations are repeated until there is no confirmation video with an error. When it is checked that there is no error in all the confirmation videos, the monitoring person performs an operation of instructing continuous playback (Yes in ST108), and a timeline screen in a continuous playback state is displayed on monitor 7 (ST109).

The inter-camera tracking of the person who is the tracking target is interrupted by designating the video display period instead of the selection of a person on the person search screen and designating the video display period on the tracking result editing screen, but the video display period designated on the person search screen or the tracking result editing screen is in a state of interpolating the missing part of the inter-camera tracking information, so when continuous playback is performed on the timeline screen in the continuous playback state, it is possible to play back the video of the person who is the tracking target without interruption.

Hereinafter, each screen shown in FIG. 4 will be described in detail.

First, a person search screen (tracking target search screen) illustrated in FIG. 4 will be described. FIG. 7 is an explanatory diagram illustrating a person search screen displayed on monitor 7.

The person search screen (tracking target search screen) is used to designate the date and time when the person desired to be tracked performs a problematic action such as shoplifting to find out the video in which the person who is the tracking target is captured, and designate the person who is the tracking target on the video, and includes search date and time designation portion 41, search camera designation portion 42, video display portion 43, playback operation portion 44, display time adjustment portion 45, video display period designation portion 46, adjustment range designation portion 47, selection cancellation button 48, and setting completion button 49.

In search date and time designation portion 41, the monitoring person designates the date and time that is the center of the period during which the person who is a tracking target is assumed to be captured. If the date and time is designated in search date and time designation portion 41 and search button (search instructing portion) 51 is operated, the video at the designated date and time is displayed on video display portion 43.

In search camera designation portion 42, the monitoring person selects camera 1 according to the search mode (single camera mode and plural camera mode). In the single camera mode, single camera 1 is designated, and a video in which the person who is the tracking target is captured is found out from among the videos from single camera 1. In the plural camera mode, plural cameras 1 are designated, and a video in which the person who is the tracking target is captured is found out from among videos from plural cameras 1.

Search mode selection portion (radio button) 52, camera selection portion 53, camera selection button 54, and map display button 55 are provided in search camera designation portion 42.

In search mode selection portion 52, one of the single camera mode and the plural camera mode is selected. In camera selection portion 53, single camera 1 is selected by using a pull-down menu.

If camera selection button 54 is operated, a camera selection screen (not shown) is displayed, and plural cameras 1 can be selected on the camera selection screen. The camera selection screen displays a list of cameras 1 provided in the store.

When map display button 55 is operated, a camera position confirmation screen (not shown) is displayed. It is possible to check the position of camera 1 from the camera position confirmation screen. The camera position confirmation screen is obtained by superimposing camera icons indicating the positions of camera 1 on the map image showing the layout in the store, and it is possible to check the position of selected camera 1, and select another camera icon to select another camera 1.

Information on the selection state of the search mode (the single camera mode and the plural camera mode) and information on the selected state of camera 1 are retained in an information storage unit, not shown, and at the next start-up, a person search screen is displayed with the search mode and camera 1 being selected at the time of last termination as it is.

When the single camera mode is selected, the date and time and camera 1 are designated, and search button 51 is operated, the person search screen by a single camera shown in FIG. 7 is displayed. The video from designated single camera 1 is displayed in video display portion 43, on the person search screen by a single camera. On the other hand, when the plural camera mode is selected, the date and time and camera 1 are designated, and search button 51 is operated, the person search screen (not shown) by plural cameras is displayed. The videos from designated plurality of cameras 1 are arranged and displayed in video display portion 43, on the person search screen by plural cameras.

In video display portion 43, the video of camera 1 is displayed. In video display portion 43, red person frame (tracking mark) 61 is displayed in the image area of the person detected in the video displayed therein, that is, the person to be subjected to the in-camera tracking process, and the person is set as the tracking target by performing an operation of selecting person frame 61, specifically, a left click operation with the pointer on person frame 61. In the vicinity of video display portion 43, the name of camera 1 and the date and time, that is, the imaging time of the video are displayed.

Playback operation portion 44 is used to perform operations related to playback of video displayed on video display portion 43. Various buttons 62 such as playback, reverse playback, stop, fast forward, and rewind are provided in playback operation portion 44, and it is possible to efficiently view videos and to efficiently find the video showing the person who is the tracking target, by operating buttons 62.

Display time adjustment portion 45 is used to adjust the display time of video displayed in video display portion 43. Display time adjustment portion 45 is a so-called seek bar, and slider 63 is provided movably along bar 64. When an operation of shifting (dragging) slider 63 is performed using input device 6 such as a mouse, the video at the time indicated by slider 63 is displayed on video display portion 43. Bar 64 defines an adjustment range of the display time centered on the time designated in search date and time designation portion 41.

Video display period designation portion 46 is used for the monitoring person to input a period during which the person who is the tracking target is captured as a video display period. Video display period designation portion 46 is a so-called duration bar, and a bar (moveable operation portion) 66 representing a video display period is displayed in frame 65. In a case where a video in which a person who is a tracking target is displayed in video display portion 43 and person frame 61 is not displayed on the person, video display period designation portion 46 is used for the monitoring person to designate a period during which the person who is the tracking target appears in the video, instead of selecting person frame 61.

Adjustment range designation portion 47 is used to designate the adjustment range (effective playback range) of the display time of video displayed in video display portion 43, that is, the movement range of slider 63 defined by bar 64 of display time adjustment portion 45. In adjustment range designation portion 47, the adjustment range of the display time can be selected from a predetermined time (for example, 5 minutes, 15 minutes, or the like) by a pull-down menu.

When selection cancellation button 48 is operated, the contents designated in video display period designation portion 46 are discarded, and the designation of the video display period (the start time and the end time) can be redone. When the setting completion button 49 is operated, transition is made to the timeline screen (see FIG. 8) in the confirmation video display state.

Figure 8:
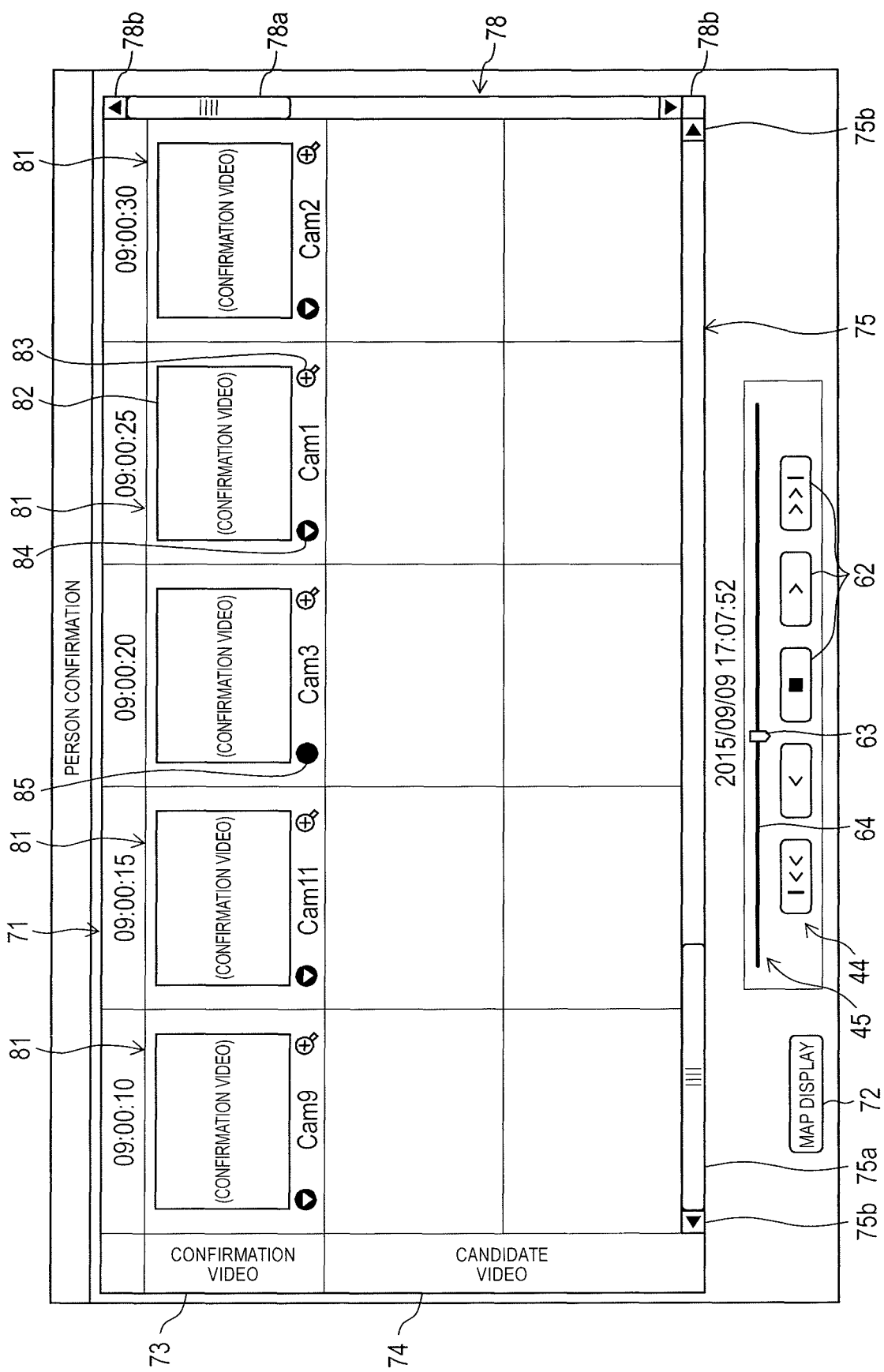
FIG. 8 is an explanatory diagram illustrating a timeline screen in a confirmation video display state displayed on monitor 7.

Next, the timeline screen (tracking target confirmation screen) in a confirmation video display state shown in FIG. 4 will be described. FIG. 8 is an explanatory diagram illustrating a timeline screen in a confirmation video display state displayed on monitor 7.

On the person search screen shown in FIG. 7, if the monitoring person operates setting completion button 49 after selecting person frame 61 in video display portion 43 and designating a person who is the tracking target, transition is made to the timeline screen in the confirmation video display state shown in FIG. 8.

The timeline screen in a confirmation video display state displays the video from each camera 1 having the highest possibility of showing the person designated as the tracking target on the person search screen as a confirmation video to allow the monitoring person to check whether there is an error in the inter-camera tracking information (initial tracking information) by using the confirmation video, and video display portion 71, playback operation portion 44, display time adjustment portion 45, and map display button 72 are provided on the timeline screen.

Playback operation portion 44 and display time adjustment portion 45 are used to display videos as a moving image on the timeline screen (see FIG. 9) in a continuous playback state, which is similar to the person search screen (see FIG. 7), will be described in detail later.

When map display button 72 is operated, a camera position confirmation screen (not shown) is displayed. It is possible to check the position of camera from the camera position confirmation screen. The camera position confirmation screen is obtained by superimposing camera icons indicating the positions of camera 1 on the map image showing the layout in the store, and it is possible to check the position of camera 1 capturing the confirmation video.

On the person search screen (see FIG. 7), even in a case where the monitoring person operates setting completion button 49 after designating a video display period in video display period designation portion 46, transition is made to the timeline screen in a confirmation video display state, but the timeline screen (see FIG. 11) at this time will be described in detail later.

In video display portion 71, confirmation video display portion 73 and candidate video display portion 74 are provided. Videos are displayed in candidate video display portion 74, on the timeline screen (see FIG. 10) in a candidate video display state, and candidate video display portion 74 will be described in detail later.

A predetermined number of camera-specific video display portions 81 are provided side by side in the horizontal direction in confirmation video display portion 73, confirmation videos are arranged and displayed in order of imaging time in video display frame 82 of camera-specific video display portion 81, and confirmation videos from entering the monitoring area (in the store) and starting the tracking until exiting the monitoring area are arranged and displayed from the left end in an order of imaging time. In camera-specific video display portion 81, the imaging time of each confirmation video and the name of camera 1 that captures each confirmation video are displayed. In the initial state when the timeline screen is opened, the confirmation video at the tracking start time when in-camera tracking is started by camera 1 is displayed as a still video. When there is no error in the confirmation video, a transition can be made to the continuous playback in response to the operation of playback operation portion 44. In the confirmation video, the person frame is displayed on the person detected and traced from the confirmation video, similar to the person search screen (see FIG. 7).

In camera-specific video display portion 81, enlargement button 83 and candidate video display button 84 are provided. When enlargement button 83 is operated, an enlarged video display screen (not shown) enlarging and displaying the confirmation video is popped up in a separate window, and the confirmation video can be observed in detail on the screen. When candidate video display button 84 is operated, the transition is made to the timeline screen (see FIG. 10) in the candidate video display state.

In confirmation video display portion 73, a tracking target designation video, that is, a video in which a person is designated as a tracking target on the person search screen (see FIG. 7) is also displayed, and instead of candidate video display button 84, mark 85 for identifying the tracking target designation video is displayed at camera-specific video display portion 81 displaying the tracking target designation video. A frame image representing the tracking target designation video may be displayed in video display frame 82 of camera-specific video display portion 81. A frame image representing the confirmed state may be displayed in the confirmed confirmation video.

First scroll bar (scroll operation portion) 75 is provided in video display portion 71. In a case where all confirmation videos do not fit in confirmation video display portion 73 (the display area of the confirmation video), first scroll bar 75 is used to slide display the confirmation video in the arrangement direction of the confirmation video, that is, in the horizontal direction, the confirmation video can be slid in the horizontal direction by dragging knob 75a, and the confirmation video can be slid in the directions of arrows 75*b* by clicking arrows (left and right arrows) 75*b*, together with knob 75*a* by one unit (one confirmation video).

Since it is determined whether or not the confirmation video displayed in confirmation video display portion 73 belongs to the person designated as the tracking target, on the timeline screen in the confirmation video display state configured in this way, the monitoring person can check whether or not there is an error in the inter-camera tracking information (initial tracking information) regarding the person designated as the tracking target. In a case where there is an error in the inter-camera tracking information, the person who is the tracking target is not captured in the confirmation video, or the person who is the tracking target is captured but the person frame is displayed on a person different from the person set as the tracking target, and the monitoring person can check whether or not there is an error in the inter-camera tracking information by viewing the confirmation video.

Here, in a case where there is no error in all the confirmation videos displayed on confirmation video display portion 73, that is, the person who is the tracking target is captured in all the confirmation videos, and the person frame is displayed on the person, the operation of instructing continuous playback, that is, playback button 62 in playback operation portion 44 is operated. A transition is made to the timeline screen in a continuous playback state shown in FIG. 9.

Figure 9:
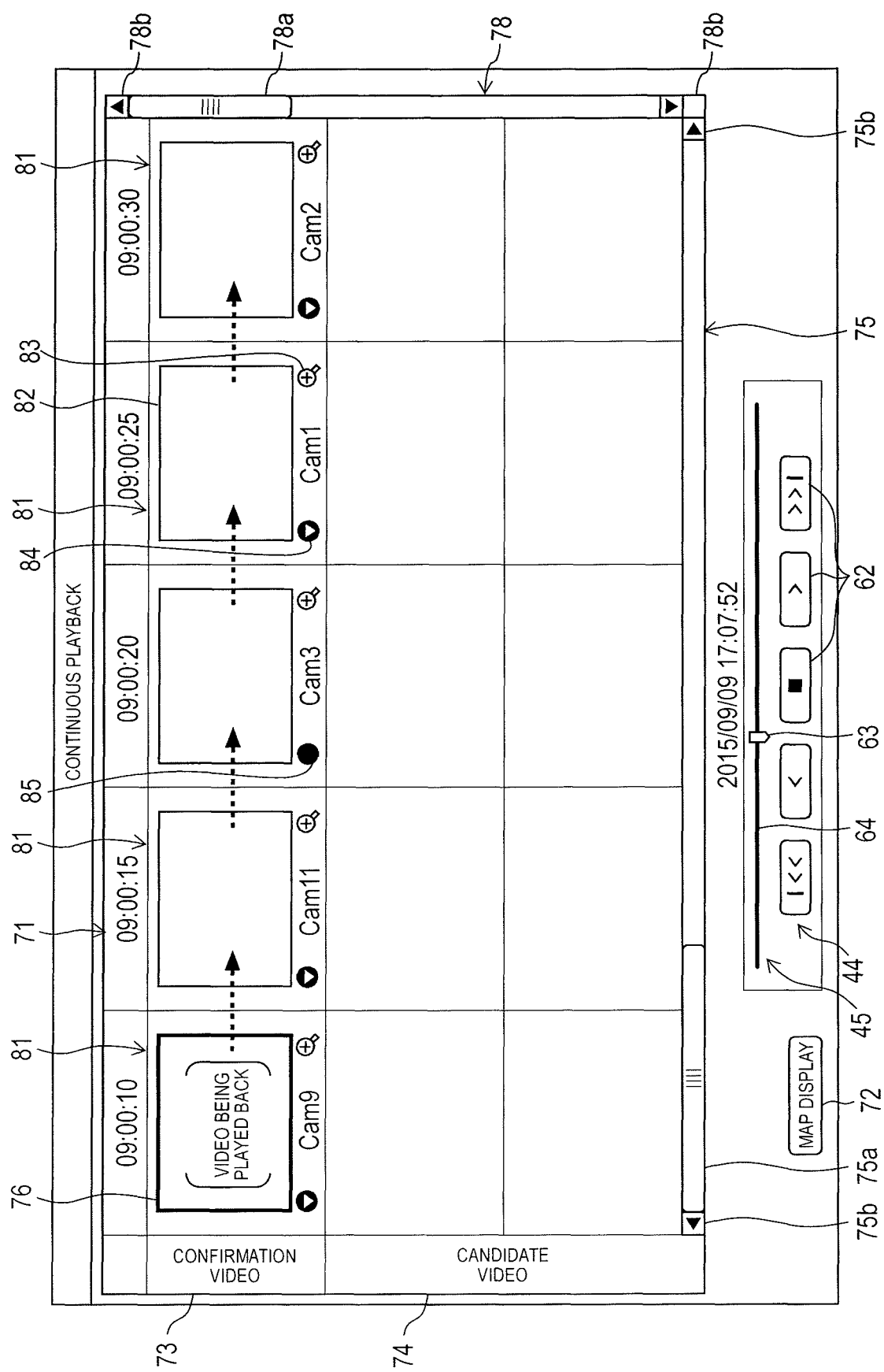
FIG. 9 is an explanatory diagram illustrating a timeline screen in a continuous playback state displayed on monitor 7.

Next, the timeline screen (continuous playback screen) in a continuous playback state shown in FIG. 4 will be described. FIG. 9 is an explanatory diagram illustrating a timeline screen in a continuous playback state displayed on monitor 7.

Although the timeline screen in the continuous playback state has substantially the same configuration as the timeline screen in the confirmation video display state (see FIG. 8), continuous playback is performed in which the confirmation video displayed in confirmation video display portion 73 is sequentially displayed as a moving image with the lapse of time, on the timeline screen in the continuous playback state. Frame image 76 indicating that playback is in progress is displayed on the confirmation video being played back.

In playback operation portion 44, the start point (left end) of bar 64 that defines the movement range of slider 63 for adjusting the display time of the confirmation video displayed in confirmation video display portion 73, that is, the adjustment range of the display time is the start time of the confirmation video having the earliest imaging time, and the end point (right end) of bar 64 is the end time of the confirmation video having the latest imaging time.

Here, the video display period in which the video from each camera 1 is displayed as a moving image is the period during which the person frame is displayed, that is, the period during which the person is detected and traced in the in-camera tracking for each camera 1. If the video display periods do not match in the preceding and subsequent videos, that is, if there is a time lag between the end time of the preceding video and the start time of the subsequent video, a process of temporally connecting video display periods by extending the preceding and subsequent periods is performed so that the playback of the video is not interrupted in the middle. The video display periods overlap in the preceding and subsequent videos in some cases, and in this case, the preceding and subsequent videos are played in parallel with each other. Thus, at the time of continuous playback, one or two videos are always played back.

Since the confirmation videos are arranged and displayed sequentially from the left starting from the confirmation video having the earliest imaging time on the timeline screen in the continuous playback state, the confirmation video is played back sequentially from the left during continuous playback, but if all the confirmation videos do not fit in confirmation video display portion 73, a process of automatically sliding the confirmation videos at an appropriate timing is performed, so the monitoring person can view all the confirmation videos which are continuously played back, without performing any special operation.

If enlargement button 83 in camera-specific video display portion 81 is operated, an enlarged video display screen (not shown) enlarging and displaying the confirmation video is popped up in a separate window, and on this screen, the confirmation video can be displayed as a moving image in an enlarged state. When enlargement button 83 is operated during the continuous playback, the enlarged display is made effective for all subsequent confirmation videos, and thus enlarged videos may be continuously played back in one or two separate windows.

Figure 10:
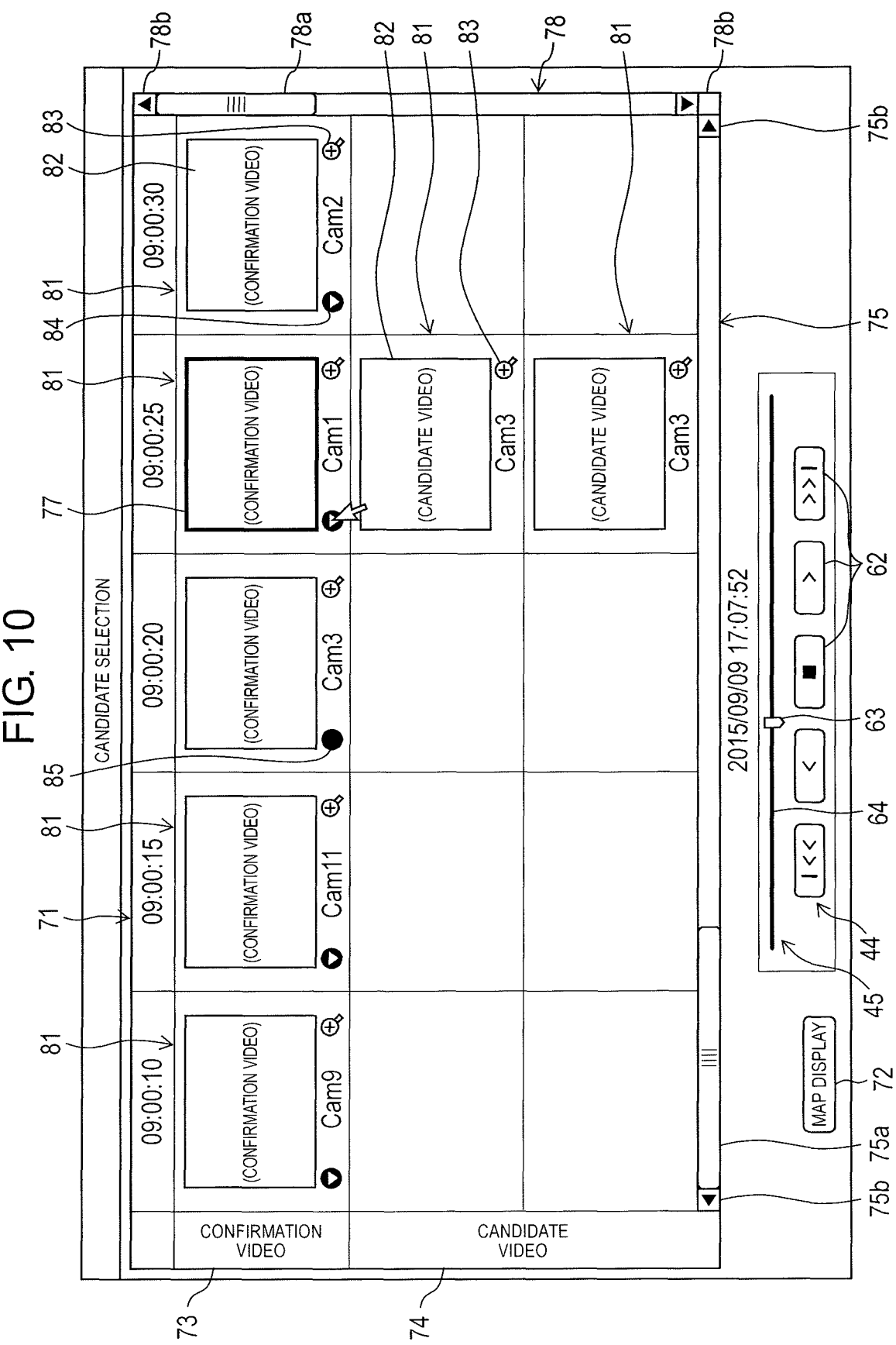
FIG. 10 is an explanatory diagram illustrating a timeline screen in a candidate video display state displayed on monitor 7.

Next, the timeline screen (candidate selection screen) in the candidate video display state shown in FIG. 4 will be described. FIG. 10 is an explanatory diagram illustrating a timeline screen in a candidate video display state displayed on monitor 7.

In a case where a confirmation video with an error is found among the plurality of confirmation videos displayed on the timeline screen (see FIG. 8) in the confirmation video display state, that is, the person who is the tracking target is not captured in one of the confirmation videos, or the person who is the tracking target is captured but the person frame indicating the tracking target is displayed on a person different from the person set as the tracking target, and transition is made to the timeline screen in the candidate video display state shown in FIG. 10 by the monitoring person operating candidate video display button 84 corresponding to the confirmation video.

On the timeline screen (candidate selection screen) in the candidate video display state, a video whose possibility of showing the person set as the tracking target is the next highest of the confirmation video is displayed as candidate videos so as to be selected by the monitoring person, in a case where there is an error in the confirmation videos displayed on the timeline screen in the confirmation video display state.

The timeline screen in the candidate video display state is substantially the same as the timeline screen in the confirmation video display state (see FIG. 8), but in candidate video display portion 74, a predetermined number of camera-specific video display portions 81 are arranged in a row in the vertical direction under the confirmation video selected as having an error, candidate videos are arranged and displayed in descending order of the link score in video display frame 82 of camera-specific video display portion 81. On the timeline screen in the candidate video display state, frame image 77 indicating the selected state is displayed in a predetermined display color (for example, yellow) in video display frame 82 of the confirmation video corresponding to the candidate video.

Second scroll bar (scroll operation portion) 78 is provided in video display portion 71. When all the candidate videos do not fit in candidate video display portion 74 (the display area of a candidate video), second scroll bar 78 is used to slide and display the candidate video in the arrangement direction of the candidate video, that is, in the vertical direction, the candidate video can be slid in the vertical direction by dragging knob 78*a*, and the candidate video can be slid in the directions of arrows 78b by clicking arrows (up and down arrows) 78b, together with knob 78a by one unit (one candidate video).

When enlargement button 83 in camera-specific video display portion 81 of candidate video display portion 74 is operated, an enlarged video display screen (not shown) enlarging and displaying the candidate video is popped up in a separate window, and it is possible to observe the candidate video in detail on this screen.

In a case where there is an appropriate candidate video, among candidate videos displayed in candidate video display portion 74 on the timeline screen in the candidate video display state, that is, a candidate video in which the person who is the tracking target is captured is found, and a person frame is displayed on the person, the monitoring person performs an operation (left click) of selecting the candidate video.

Then, inter-camera tracking information corrector 38 performs a process of correcting the tracking information such that the person corresponding to the candidate video selected on the timeline screen in the candidate video display state is associated with the person who is designated as the tracking target on the person search screen (see FIG. 7). Then, the timeline screen (see FIG. 8) in a confirmation video display state is displayed on monitor 7 in a state where the result of correcting the tracking information is reflected.

The result of correcting the tracking information is reflected on the timeline screen in the confirmation video display state, that is, the confirmation video selected as having an error on the timeline screen in the confirmation video display state is replaced with the candidate video selected on the timeline screen in the candidate video display state and displayed. As the confirmation video having an error is replaced with the candidate video, the preceding and subsequent confirmation videos of the replaced confirmation video may be changed. That is, in inter-camera tracking information corrector 38, a process of sequentially selecting a person having the highest link score for each camera 1 is performed, with a person corresponding to the candidate video as a starting point. When the selected person is different from the person corresponding to the confirmation video, the replacement of the person occurs and the confirmation video is changed accordingly. When tracking information is corrected in inter-camera tracking information corrector 38, the person set in tracking target setter 32, the person corresponding to the confirmation video for which confirmation operation was performed by the monitoring person, and the person corresponding to the candidate video replaced with the confirmation video already having an error are excluded from the correction target, so the confirmation video regarding those persons is not changed.

In the present exemplary embodiment, an appropriate candidate video is selected on the timeline screen in a candidate video display state, but a person frame on the candidate video may be selected. In this way, it is possible to avoid the tracking information from being corrected by the wrong person.

Next, the case where person frame 61 is not displayed on the person who is the tracking target on the person search screen shown in FIG. 7 will be described.

In the present exemplary embodiment, on the person search screen shown in FIG. 7, a video in which the person who is the tracking target is captured is found out by designating the date and time when the person desired to be tracked performs a problematic action such as shoplifting and selecting camera 1 that captures the place where the person desired to be tracked performs the problematic action and the person who is the tracking target can be designated on the video, but the person who is the tracking target may not be tracked on the date and time of interest and from the video obtained from camera 1 in some cases. In this case, since person frame 61 is not displayed on the person who is the tracking target, the tracking target cannot be designated by selecting person frame 61.

In such a case, in the present exemplary embodiment, instead of selecting person frame 61, during a period during which a person who is a tracking target appears in the video, that is, a period from when the person who is the tracking target appears in the video to when the person disappears from the video can be designated by the monitoring person as the video display period of corresponding camera 1. The video display period is designated in video display period designation portion 46 of the person search screen.

In video display period designation portion 46 of the person search screen, bar 66 representing the video display period is displayed within frame 65, and the video display period can be adjusted by using bar 66. The video display period is defined by the start time and the end time, and the left end and right end positions of bar 66 are the start time and end time of the video display period, respectively.

To adjust the start time of the video display period, a pointer is placed at the left end of bar 66 representing the start time and a drag operation is performed. To adjust the end time of the video display period, a pointer is placed at the right end of bar 66 representing the end time and a drag operation is performed. Incidentally, if the pointer is placed at the left end or the right end of bar 66, the pointer changes to a trim pointer having a double arrow shape. At this time, while watching the video displayed on video display portion 43, the monitoring person may designate a time when the person who is the tracking target first appears in the video or an appropriate time at the vicinity thereof as the start time of the video display period. The time immediately before the person who is the tracking target disappears from the video or the appropriate time at the vicinity thereof may be designated as the end time of the video display period.

By selecting videos of the start time and the end time, it is possible to designate the start time and end time of the video display period. That is, playback operation portion 44 and display time adjustment portion 45 are operated to display the video of the corresponding time (start time or end time) in video display portion 43. Then, an operation to select the video of video display portion 43 is performed. Specifically, a pointer is placed on the video in video display portion 43 and a left click operation is performed. Thus, the imaging time of the video displayed in video display portion 43 is designated as start time or end time.

Figure 11:
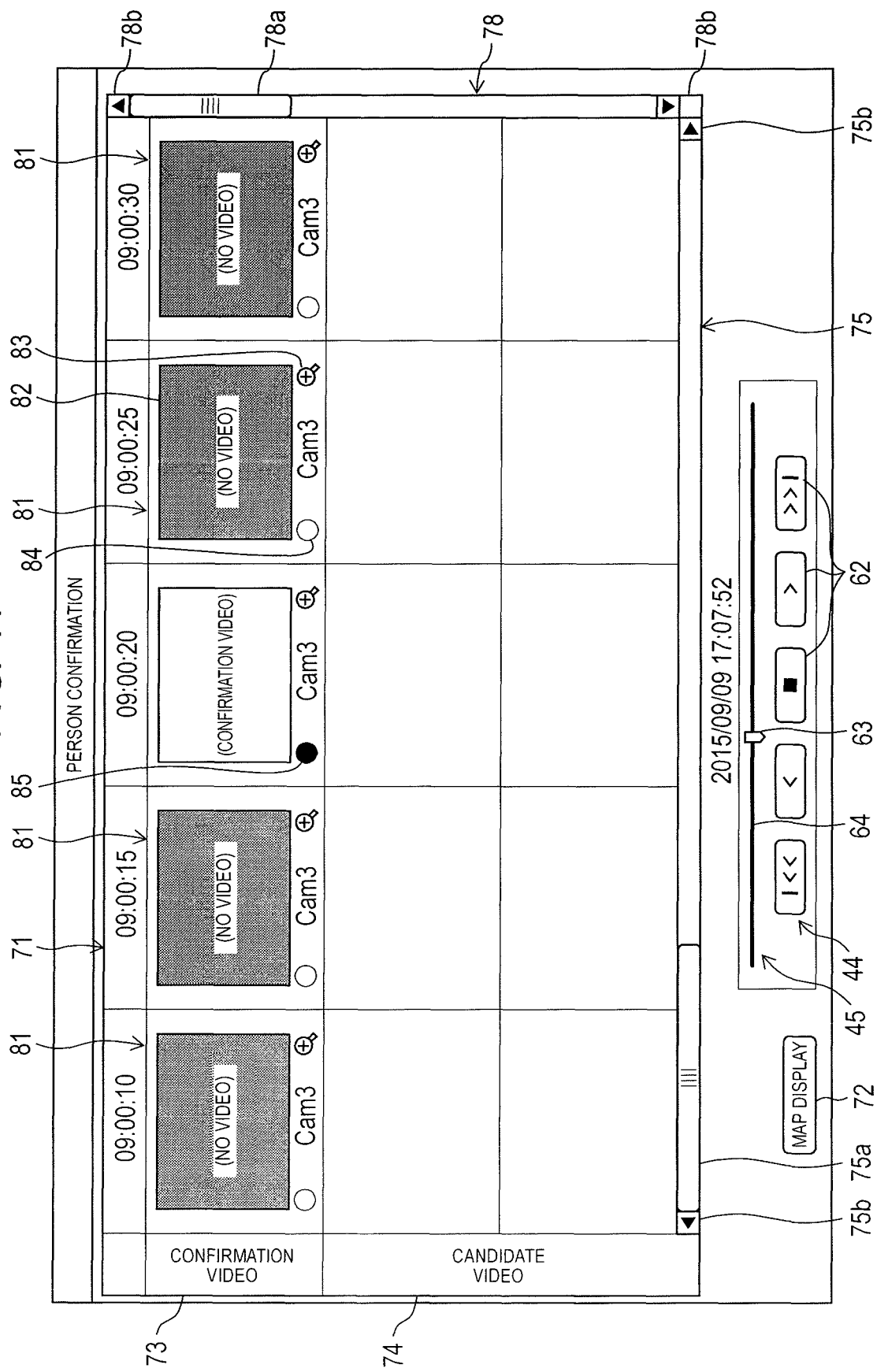
FIG. 11 is an explanatory diagram illustrating a timeline screen when a video display period is designated on the person search screen.

In this manner, when the start time and the end time of the video display period are specified and setting completion button 49 is operated, the screen transitions to the timeline screen (see FIG. 11).

Next, a timeline screen when the video display period is designated on the person search screen shown in FIG. 7 will be described. FIG. 11 is an explanatory diagram illustrating a timeline screen when a video display period is designated on the person search screen.

On the timeline screen, normally, confirmation videos for respective cameras 1 are arranged and displayed in order of imaging time based on inter-camera tracking information, but in a case where the video display period is designated instead of the operation of designating the person who is the tracking target by the selection of person frame 61 on the person search screen, there is no in-camera tracking information of the person who is the tracking target, so it is not possible to specify a person who is a tracking target from the persons tracked in the video from the adjacent camera, in the link score of the inter-camera tracking information. Therefore, on the timeline screen when the video display period is designated on the person search screen, only one confirmation video for camera 1 for which the video display period is designated is displayed, and video display frames 82 of preceding and succeeding cameras 1 are in the blank state (a state where video is not displayed). Therefore, the monitoring person performs an operation of manually selecting the person who is the tracking target in adjacent preceding and succeeding cameras 1.

In this case, after selecting preceding and succeeding cameras 1, an operation of selecting "manual person search" is performed. Specifically, "manual person search" is selected in the menu displayed by placing the pointer on video display frame 82 in the blank state and performing a right click operation. Then, the person search screen shown in FIG. 7 is displayed.

At this time, in a case where camera 1 before camera 1 for which the video display period is designated is selected first, in the person search screen, the video from adjacent camera 1 is displayed on the person search screen in the period immediately before the designated video display period. In a case where camera 1 after camera 1 for which the video display period is designated is selected first, the video from adjacent camera 1 is displayed on the person search screen in the period immediately after the designated video display period. Then, if person frame 61 is displayed on the person who is the tracking target on the person search screen, person frame 61 is selected and the person who is the tracking target may be designated.

In this manner, by selecting person frame 61 to designate the person who is the tracking target and operating setting completion button 49, a transition is made to the timeline screen. Here, by inter-camera tracking, persons with the highest possibility of being the same person as the person who is the tracking target are sequentially selected for each camera 1, a confirmation video of preceding camera 1 on the timeline screen in a case where tracking can be done in the video from preceding camera 1, and a confirmation video of subsequent camera 1 on the timeline screen in a case where tracking can be done in the video from subsequent camera 1.

In addition, even in a case where a person who is a tracking target is captured in the video, for cameras 1 preceding and subsequent camera 1 for which the video display period is designated at the beginning, in a case where person frame 61 is not displayed on that person, it is not possible to designate a person who is a tracking target by selecting person frame 61. In this case, again, the video display period for camera 1 may be designated. Then, the person search screen for adjacent camera 1 is displayed, and a person who is a tracking target by selecting person frame 61 is designated or the video display period is designated. In a case where the person who is the tracking target by selecting person frame 61 can be designated, confirmation videos of cameras 1 preceding or subsequent camera 1 are displayed on the timeline screen.

As described above, in the present exemplary embodiment, even in the case where the person who is the tracking target cannot be designated by the selection of person frame 61 in the video at the date and time of interest and from camera 1, by designating the video display period regrading camera 1, camera 1 becomes the starting point of the timeline screen, the video of adjacent camera 1 is determined, and the videos of cameras 1 which are continuous in chronological order can be displayed on the timeline screen. This makes it possible to reduce the burden on the user as compared with designating the person who is the tracking target while sequentially checking the video of each camera 1.

Next, a case where the confirmation video is not properly played back on the timeline screen will be described.

On the timeline screen, the video of the tracking period acquired by the in-camera tracking is played back. At this time, if in-camera tracking targeting the person who is the tracking target has not succeeded over a whole appearance period from when the person who is the tracking target appears in the video to when the person disappears from the video, the tracking period acquired by the in-camera tracking becomes incomplete, and excess or deficiency occurs in the confirmation video of timeline screen. In other words, there is inconvenience in which the video with no person who is a tracking target is displayed, a video in which the person who is the tracking target appears is ended in the middle, the video in which the person who is the tracking target appears is started from the middle, and the video in which the person who is the tracking target appears is played back in a state where it is not continuous.

Therefore, in the present exemplary embodiment, in a case where there is an error in the in-camera tracking information and confirmation video is not properly played back, that is, the video is not played back over a whole appearance period from when the person who is the tracking target appears in the video to when the person disappears from the video, the tracking result editing screen shown in FIG. 4 is displayed, and on the tracking result editing screen, it is possible to perform an editing operation to adjust the video display period to an appropriate range, that is, a range approximately coincident with the appearance period.

Figure 12:
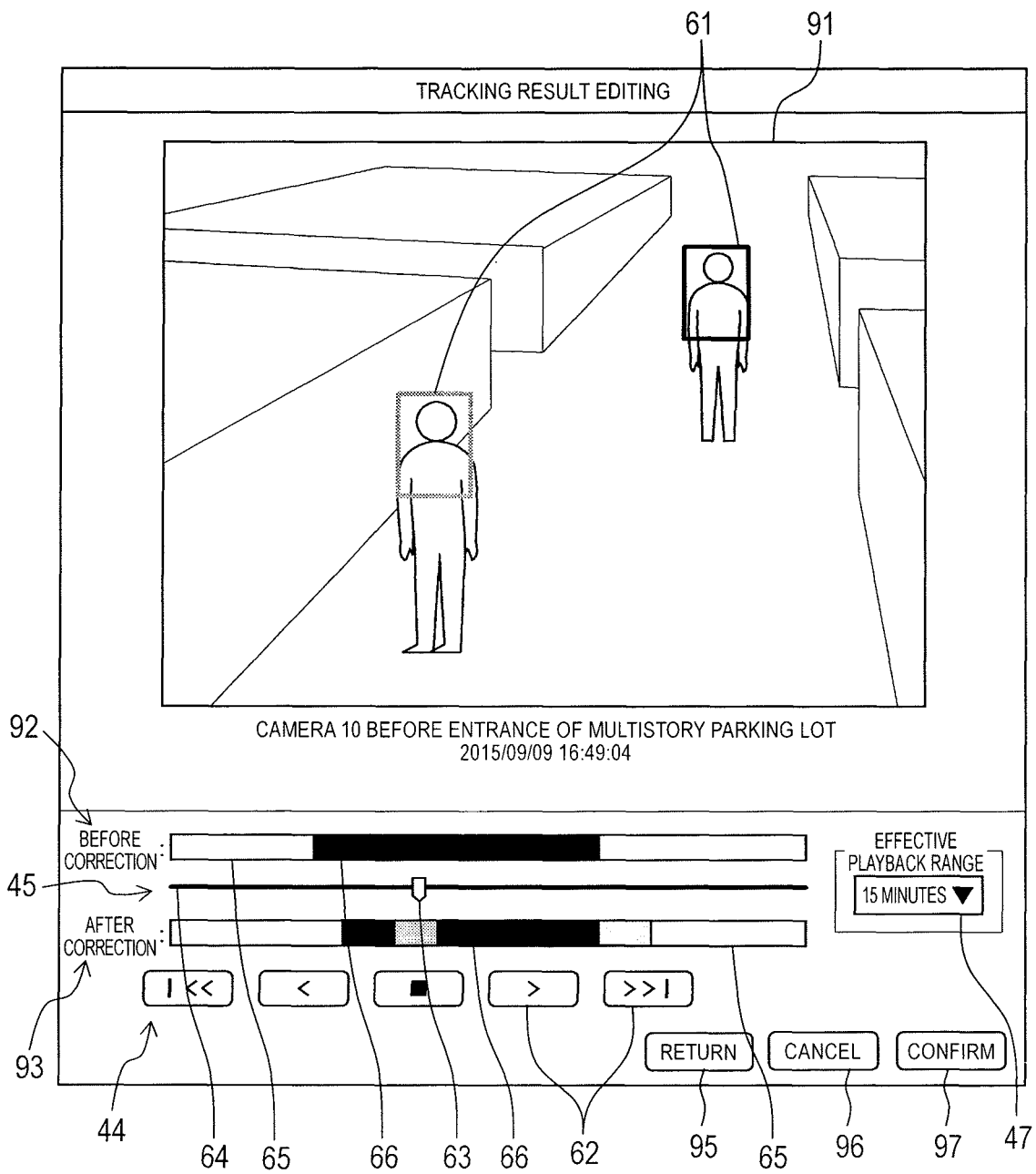
FIG. 12 is an explanatory diagram illustrating a tracking result editing screen displayed on monitor 7.

Next, the tracking result editing screen shown in FIG. 4 will be described. FIG. 12 is an explanatory diagram illustrating a tracking result editing screen displayed on monitor 7.

When on the timeline screen at the confirmation video display state shown in FIG. 8, "tracking result editing" is selected by selecting the confirmation video of camera 1 whose video display period is desired to be edited, specifically, "tracking result editing" is selected in the menu displayed by performing the right click operation on the confirmation video, the tracking result editing screen shown in FIG. 12 is popped up.

The tracking result editing screen is used for the monitoring person to perform an editing operation such that the video display period of the confirmation video becomes an appropriate period, in a case where there is excess or deficiency in the confirmation video displayed on the timeline screen. The tracking result editing screen includes video display portion 91, initial video display period display portion 92, display time adjustment portion 45, video display period designation portion 93, playback operation portion 44, adjustment range designation portion 47, return button 95, cancel button 96, and confirm button 97.

In video display portion 91, the video of camera 1 selected on the timeline screen is displayed. In the vicinity of video display portion 91, the name and installation location of camera 1 capturing the video and the date and time, that is, the imaging time of the video are displayed.

Initial video display period display portion 92 is used to display the unedited video display period, that is, the tracking period obtained by in-camera tracking of the person who is the tracking target. Initial video display period display portion 92 is a so-called duration bar, and bar 66 representing the initial video display period (tracking period) is displayed in frame 65. In bar 66, the positions of the left end and the right end are the start time and end time of the video display period, respectively. Bar 66 is displayed in red.

Display time adjustment portion 45 is used to adjust the display time of video displayed in video display portion 91. Display time adjustment portion 45 is a so-called seek bar, and slider 63 is provided movably along bar 64. When an operation of shifting (dragging) slider 63 is performed using input device 6 such as a mouse, the video at the time indicated by slider 63 is displayed on video display portion 91.

Video display period designation portion 93 is used to display the video display period input by the editing operation of the monitoring person. Similar to initial video display period display portion 92, video display period designation portion 93 is a so-called duration bar, and a bar (moveable operation portion) 66 representing a video display period is displayed in frame 65. In bar 66, the positions of the left end and the right end are the start time and end time of the video display period, respectively. In the editable state, the positions of the left end and the right end of bar 66 can be moved by a drag operation.

The display color of bar 66 of video display period designation portion 93 changes in accordance with the state. In the state before editing, similar to initial video display period display portion 92, bar 66 is displayed in red. In the editable state, bar 66 changes to yellow. In a case where person frame 61 displayed in video display portion 91 is selected and the tracking period of person frame 61 is added to the video display period, the additional portion is displayed in blue.

Playback operation portion 44 is used to perform operations related to playback of video displayed on video display portion 91. Various buttons 62 such as playback, reverse playback, stop, fast forward, and rewind are provided in playback operation portion 44, and it is possible to efficiently view videos and to know efficiently the period during which the person set as the tracking target is captured in the image, by operating buttons 62.

Adjustment range designation portion 47 is used to designate the adjustment range (effective playback range) of the display time of video displayed in video display portion 91, that is, the movement range of slider 63 defined by bar 64 of display time adjustment portion 45. In adjustment range designation portion 47, the adjustment range of the display time can be selected from a predetermined time (for example, 5 minutes, 15 minutes, or the like) by a pull-down menu.

When return button 95 is operated, the last operation input which edited in this tracking result editing screen is discarded and the state returns to the previous state. When cancel button 96 is operated, all the edited contents related to the video display period input by the editing operation are discarded and the screen returns to the timeline screen. By operating confirm button 97, it is possible to confirm the video display period which is input by the editing operation.

An example of adjusting the video display period to an appropriate range by an editing operation on the tracking result editing screen will be described below.

Figure 13:
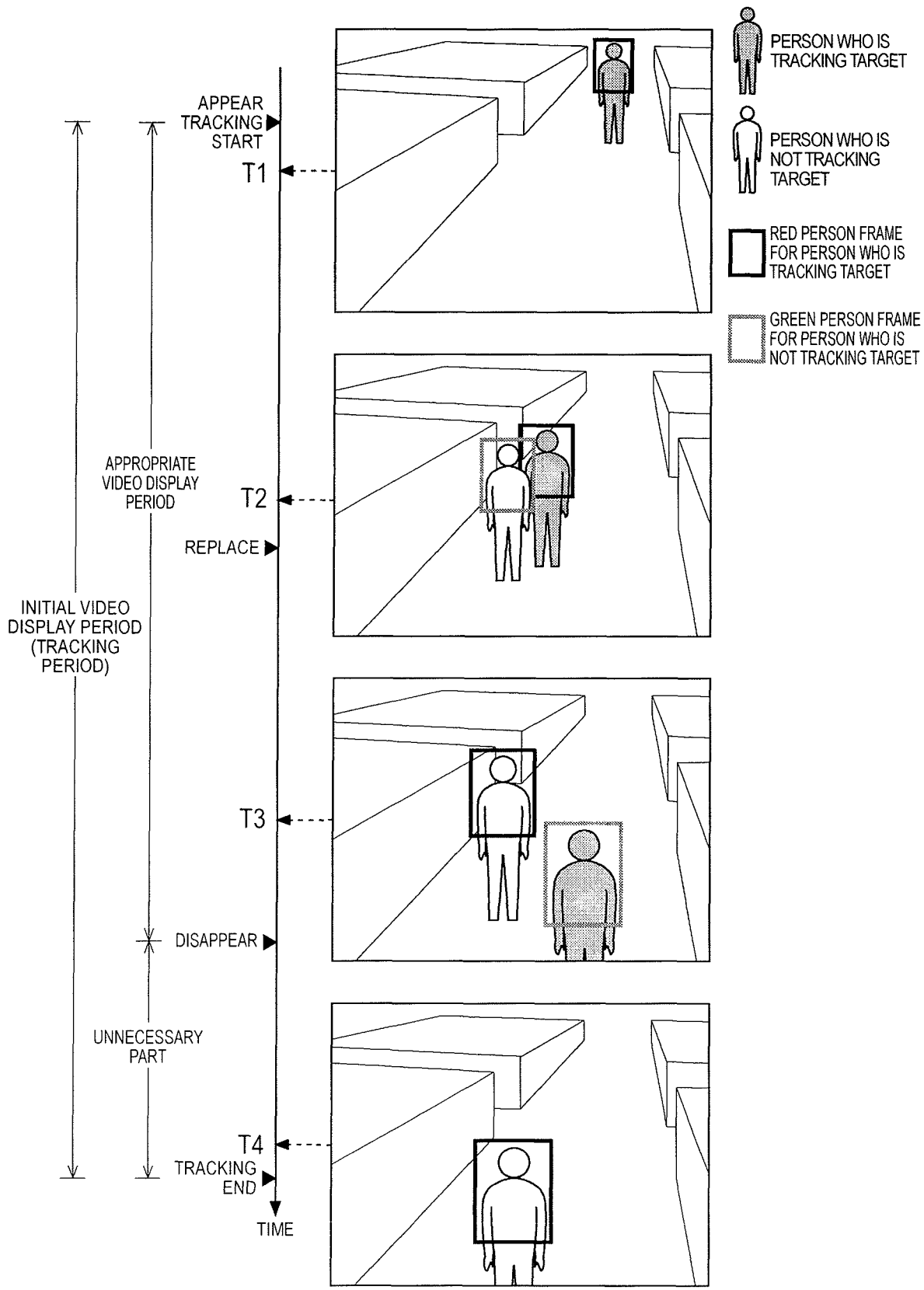
FIG. 13 is an explanatory diagram illustrating an example of a transition situation of a video.
Figure 14:
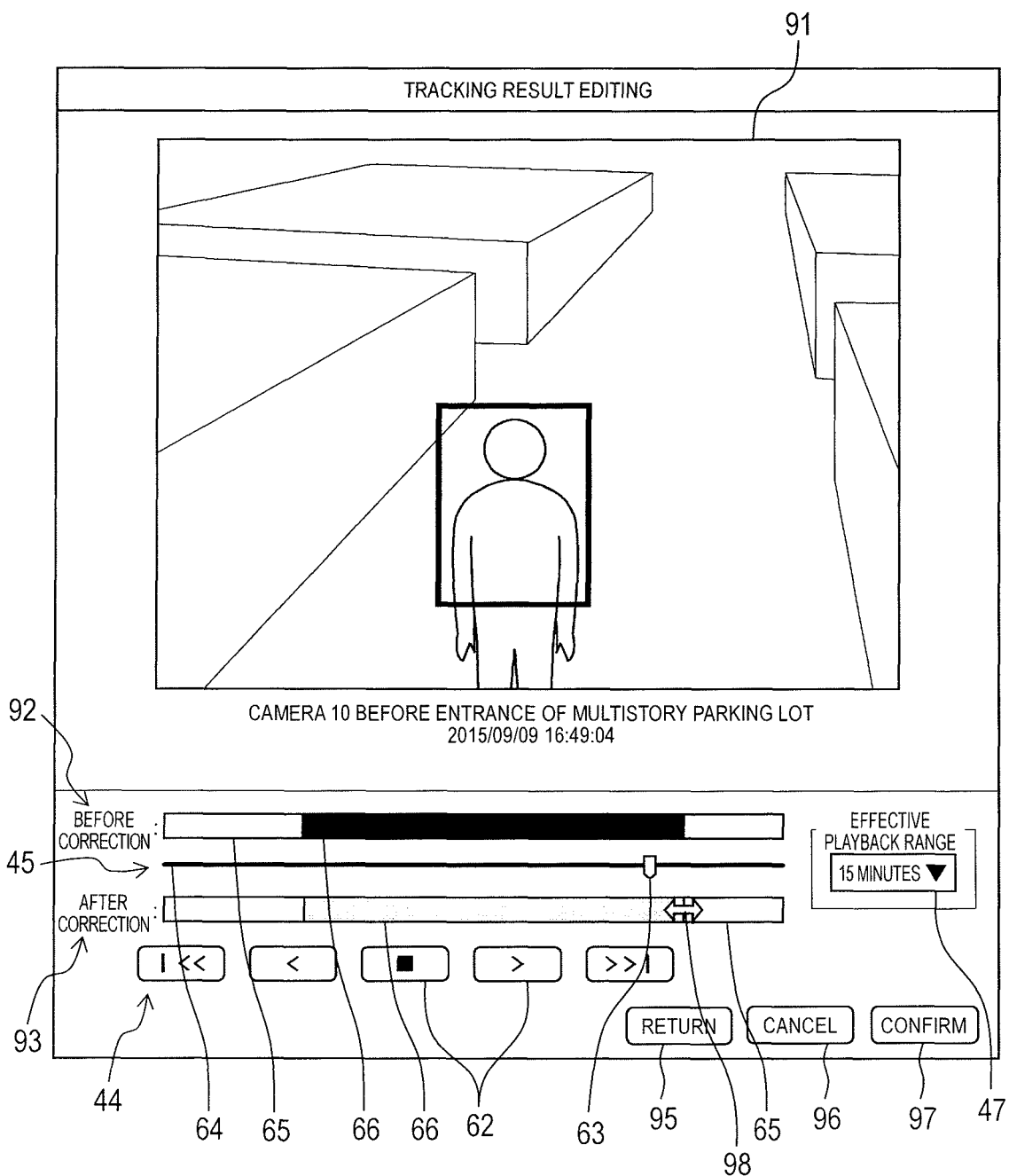
FIG. 14 is an explanatory diagram illustrating a situation at a time of an editing operation on the tracking result editing screen.

First, a case of deleting an unnecessary part of the initial video display period (tracking period) will be described. FIG. 13 is an explanatory diagram illustrating an example of a transition situation of a video. FIG. 14 is an explanatory diagram illustrating a situation at a time of an editing operation on the tracking result editing screen.

In the example shown in FIG. 13, when a person who is a tracking target appears in the video, the person is appropriately tracked as a tracking target, and in the video at times T1 and T2, a red person frame is displayed on the person who is the tracking target. Then tracking fails and the tracking person is replaced, after that, a person who is not a tracking target is tracked as the tracking target and a person who is the tracking target is tracked as a different person, and in the video at time T3, a green person frame to indicate that it is not a tracking target is displayed on the person who is the tracking target, and a red person frame to indicate that it is a tracking target is displayed on a person who is not a tracking target. After that, the person who is the tracking target disappears from the video, but inadvertently the person who is the tracking target remains in the video, and only the person who is not the tracking target appears in the video at the time T4.

In such a case, the tracking period (initial video display period) acquired by the in-camera tracking includes unnecessary periods in which another person is tracked, and the video after the person who is the tracking target no longer exists from video is displayed on the timeline screen, when video is played back.

Even in a case where the tracking person is replaced after the person who is not the tracking target is tracked as the tracking target, and after that, the person who is the tracking target has been properly tracked, the tracking period acquired by in-camera tracking includes an unnecessary period during which a different person is tracked, and unnecessary video in which the person who is the tracking target is not captured is displayed first on the timeline screen at the time of playback of the video.

As described above, in a case where there is an unnecessary part in the beginning and end of the tracking period acquired by the in-camera tracking, in the present exemplary embodiment, as shown in FIG. 14, it is possible to perform an editing operation to delete an unnecessary part of the video display period on the tracking result editing screen.

In this editing operation, the start time and end time of the video display period, that is, the positions of the left end and the right end of bar 66 displayed in video display period designation portion 93 are adjusted.

Specifically, first, "partial editing" is selected in a pop-up menu displayed by performing a right click operation on bar 66 to make bar 66 editable. At this time, bar 66 changes to yellow which represents the editable state as a whole.

Next, in a case of adjusting the start time of the video display period, a pointer is placed at the left end of bar 66 representing the start time and a drag operation is performed. To adjust the end time of the video display period, a pointer is placed at the right end of bar 66 representing the end time and a drag operation is performed. Incidentally, if the pointer is placed at the left end or the right end of bar 66, the pointer changes to trim pointer 98 having a double arrow shape.

Then, a pointer is placed on bar 66 and a left click operation is performed. Thus, the video display period is confirmed in a state where the unnecessary part in which the person who is the tracking target is not captured in the video is deleted.

Although an example of deleting an unnecessary part of the video display period by a drag operation has been shown here, it is also possible to add a missing part of the video display period by a drag operation.

Figure 15:
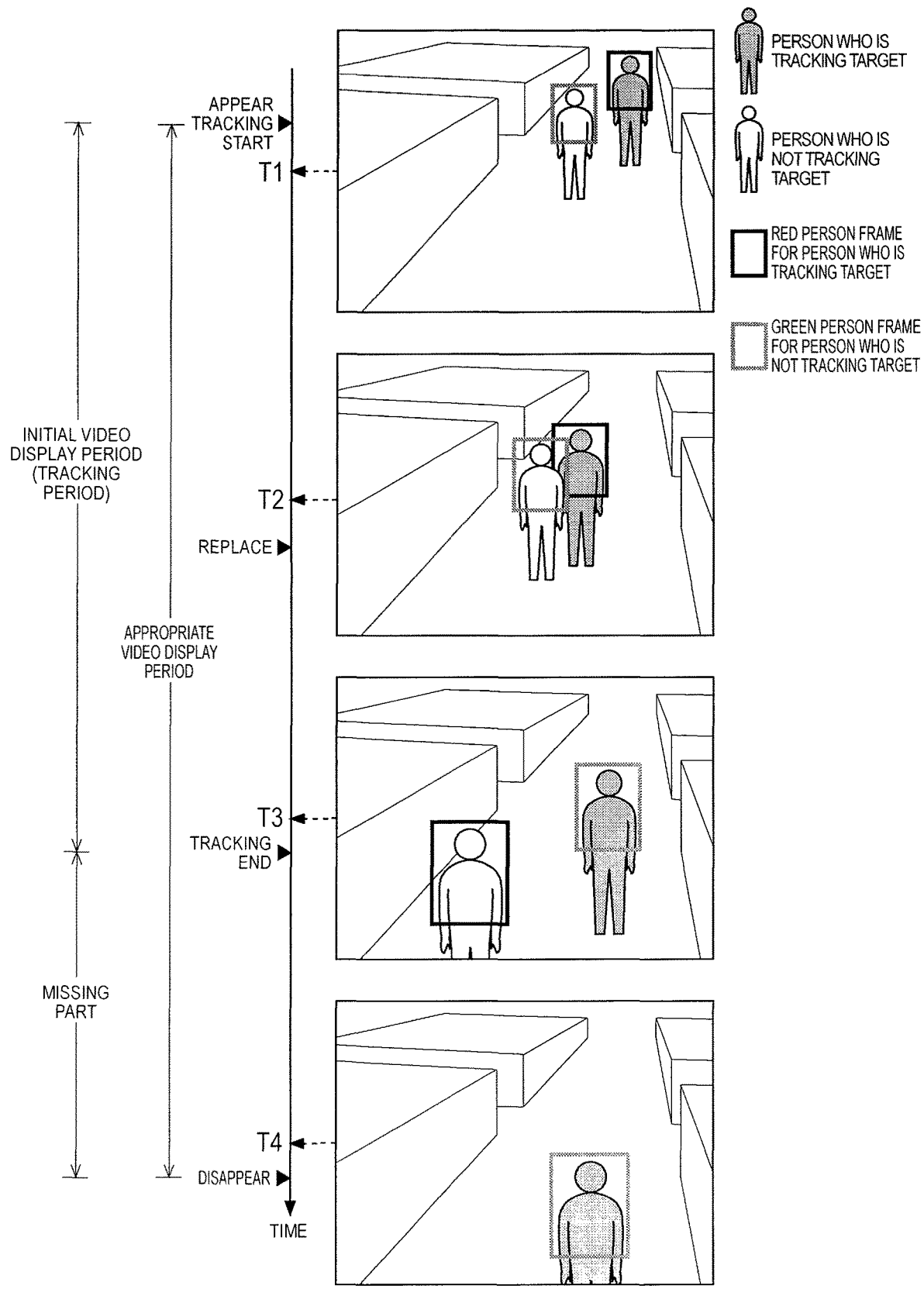
FIG. 15 is an explanatory diagram illustrating an example of a transition situation of a video.
Figure 16:
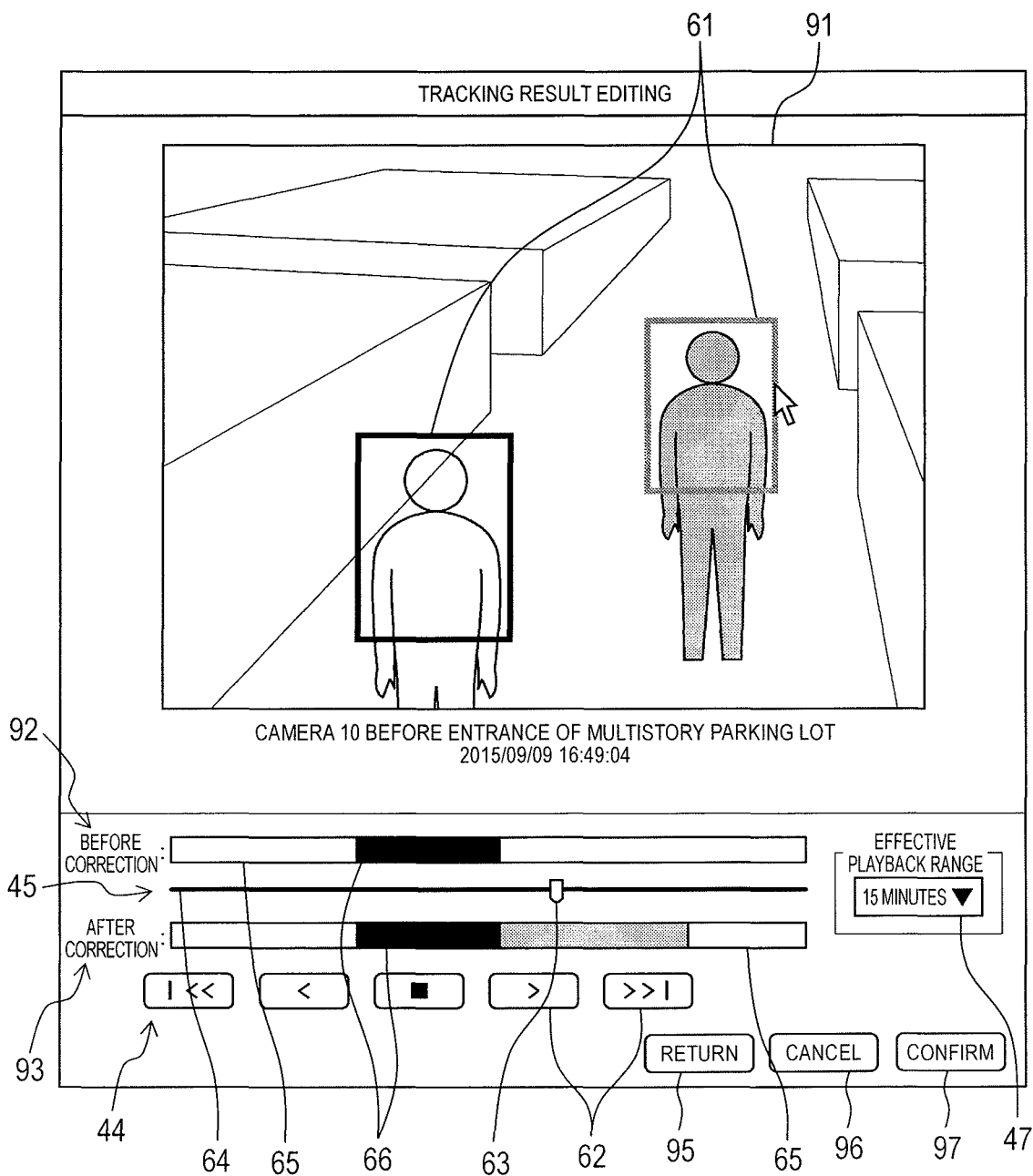
FIG. 16 is an explanatory diagram illustrating a situation at a time of an editing operation on the tracking result editing screen.

Next, a description is given of a case where a tracking period in which a person who is a tracking target has been tracked as a different person is added to the video display period. FIG. 15 is an explanatory diagram illustrating an example of a transition situation of a video. FIG. 16 is an explanatory diagram illustrating a situation at a time of an editing operation on the tracking result editing screen.

In the example shown in FIG. 15, when a person who is a tracking target appears in the video, the person is appropriately tracked as a tracking target, and in the video at times T1 and T2, a red person frame is displayed on the person who is the tracking target. After that, tracking fails and the tracking person is replaced, after that, a person who is not a tracking target is tracked as the tracking target, and a person who is the tracking target is tracked as a different person, and in the videos at times T3 and T4, a green person frame to indicate that it is not a tracking target is displayed on the person who is the tracking target, and a red person frame to indicate that it is a tracking target is displayed on a person who is not a tracking target.

In such a case, the tracking period acquired by the in-camera tracking is incomplete with a missing part on the future side, and on the timeline screen, a video showing the person who is the tracking target is interrupted in the middle at the time of playback of the video.

After the person who is not the tracking target is tracked as the tracking target and the person who is the tracking target is tracked as a different person, the tracking fails and the tracking person is replaced, and after that, in a case where the person who is the tracking target has been properly tracked as the tracking target, the tracking period (initial video display period) acquired by in-camera tracking is incomplete with a missing part on the past side, and a video showing the person who is the tracking target is displayed from the middle at the time of playback of the video on the timeline screen.

As described above, in the case where there is a missing part on the past or future part in the tracking period acquired by in-camera tracking and the person who is the tracking target is tracked as a different person, in the present exemplary embodiment, as shown in FIG. 16, on the tracking result editing screen, it is possible to perform an editing operation to add a tracking period in which the person who is the tracking target has been tracked as a different person to the video display period.

In this editing operation, in the video in the period during which the person who is the tracking target has been tracked as a different person, person frame 61 displayed on the person who is the tracking target is selected. At this time, since the person who is the tracking target is tracked as a different person, green person frame 61 is displayed on the person who is the tracking target, and the green person frame 61 is selected. Specifically, first, a pointer is placed on person frame 61 and a left click operation is performed.

Then, in video display portion 91, green person frame 61 displayed on the person who is the tracking target changes to blue indicating the selected state. The tracking period of selected person frame 61 is added to bar 66 of video display period designation portion 93. At this time, the additional part is displayed in blue.

As described above, by performing the operation to select green person frame 61 displayed on the person who is the tracking target, the color of person frame 61 changes to blue and the video display period can be confirmed. Thus, the video display period is confirmed in a state including a period during which the person who is the tracking target has been tracked as a different person.

Here, the person who is the tracking target may be tracked as a plurality of different people. In this case, green person frames displayed on the persons who are the tracking target may be sequentially select, and the tracking period of the selected plurality of person frames is added to bar 66 of video display period designation portion 93.

Incidentally, there is a case where a person who is a tracking target is tracked as a different person from the middle, and then a tracking person is replaced further, and a person who is not a tracking target is tracked as the same person in some cases. In this case, the tracking period added to the video display period includes a tracking period during which another person who is not the tracking target is tracked, and the tracking period of the different person is unnecessary, so it is necessary to delete this unnecessary part.

In this case, the additional part displayed in blue in bar 66 of video display period designation portion 93 is selected and "partial edit" is selected. Specifically, select "partial edit" from the pop-up menu displayed by performing the right click operation on the additional part displayed in blue. Then, the additional part of bar 66 changes to yellow indicating an editable state, and similar to the example shown in FIG. 14, the start time and end time of the display period are adjusted by a drag operation.

Incidentally, as described above, by selecting the person frame when the person who is the tracking target is tracked as a different person and adding the tracking period of the person frame to the video display period, the in-camera tracking information of the person who is the tracking target is corrected such that the person of the person frame is changed to the person who is the tracking target. Then, inter-camera tracking with adjacent camera 1 is performed again, and inter-camera tracking information is also corrected. At this time, as in the example shown in FIG. 16, inter-camera tracking is performed again in camera 1 on the future side if a person frame is selected on the future side, and inter-camera tracking is performed again in camera 1 on the past side if a person frame is selected on the past side.

Figure 17:
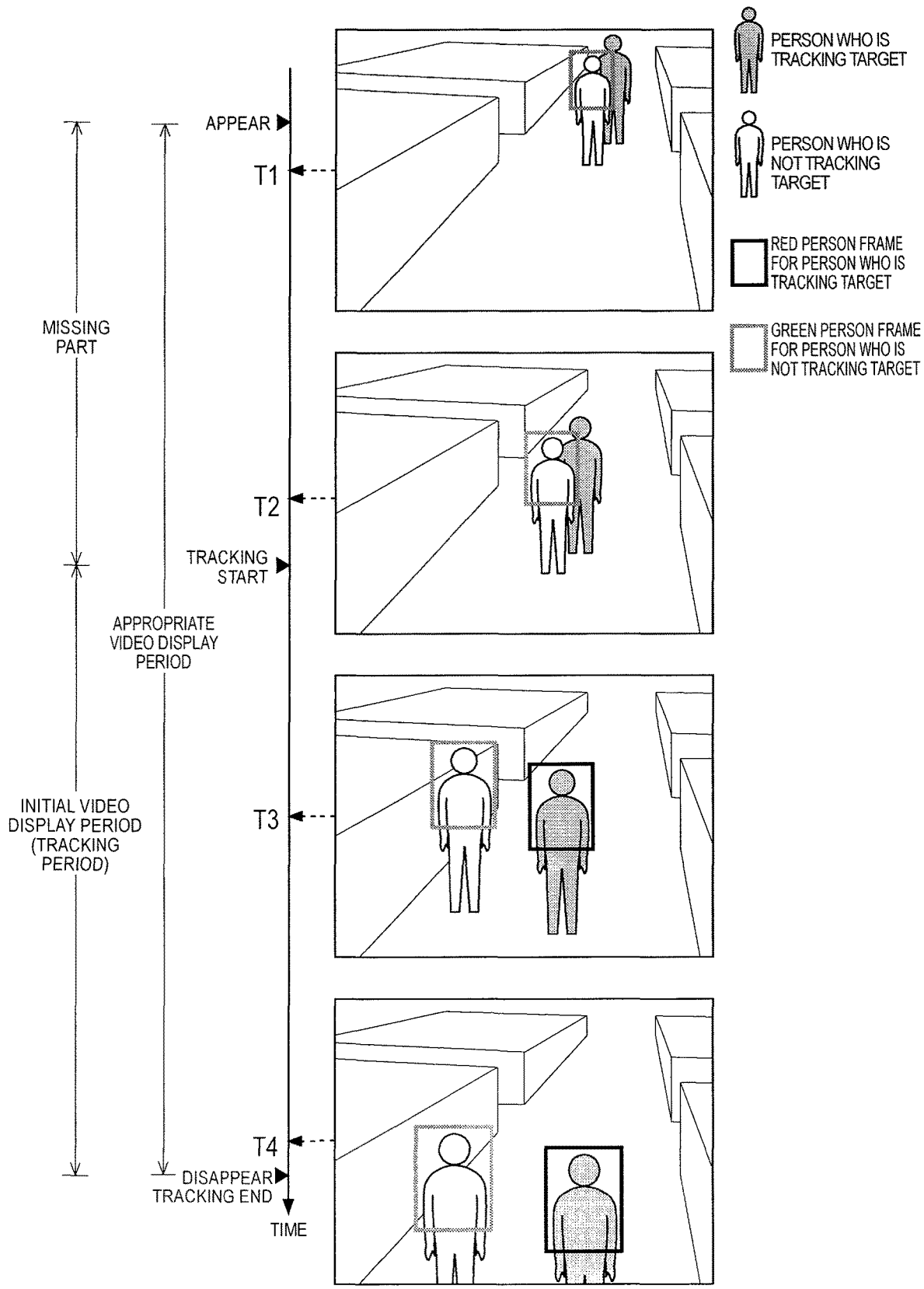
FIG. 17 is an explanatory diagram illustrating an example of a transition situation of a video.
Figure 18:
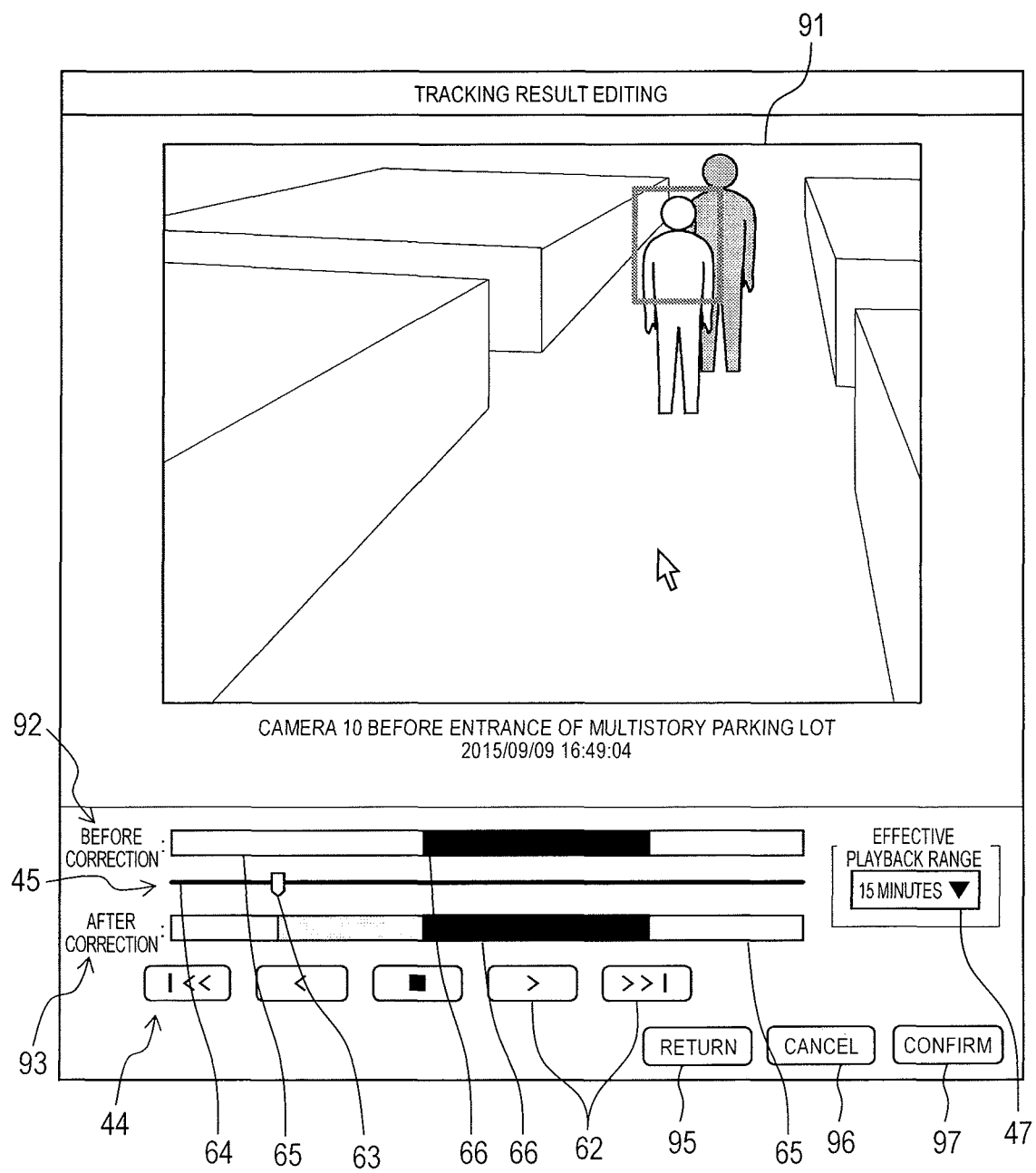
FIG. 18 is an explanatory diagram illustrating a situation at a time of an editing operation on the tracking result editing screen.

Next, a case of adding a missing part of the video display period will be described. FIG. 17 is an explanatory diagram illustrating an example of a transition situation of a video. FIG. 18 is an explanatory diagram illustrating a situation at a time of an editing operation on the tracking result editing screen.

In the example shown in FIG. 17, in the in-camera tracking, person detection of a person who is a tracking target fails from the beginning, and a person frame is not displayed on the person who is the tracking target in videos at times T1 and T2. Then, from when in-camera tracking of the person who is the tracking target starts from the middle to when the person who is the tracking target disappears from the video, the person who is the tracking target is appropriately tracked, and a red person frame is displayed on the person who is the tracking target in videos at times T3 and T4.

In such a case, the tracking period (initial video display period) acquired by the in-camera tracking is incomplete with a missing part on the past side, and on the timeline screen, a video showing the person who is the tracking target is displayed from the middle at the time of playback of the video.

In a case where the in-camera tracking of the person who is the tracking target fails in the middle and the in-camera tracking of the person who is the tracking target is ended in the middle, the tracking period (initial video display period) acquired by the in-camera tracking is incomplete with a missing part on the future side, and on the timeline screen, a video showing the person who is the tracking target is interrupted in the middle at the time of playback of the video.

As described above, in a case where there is a missing part on the past side or future side of the tracking period acquired by the in-camera tracking, in the present exemplary embodiment, as shown in FIG. 18, it is possible to perform an editing operation to add a missing part of the video display period on the tracking result editing screen.

In the editing operation, in a case where there is a missing part on the past side of the tracking period, a time when the person who is the tracking target first appears in the video or an appropriate time at the vicinity thereof is designated as the start time of the video display period. In a case where there is a missing part on the future side of the tracking period, a time immediately before the person who is the tracking target disappears from the video or an appropriate time at the vicinity thereof is designated as the end time of the video display period.

Specifically, first, playback operation portion 44 and display time adjustment portion 45 are operated to display the video of the corresponding time (start time or end time) in video display portion 91. Then, an operation to select the video in video display portion 91 is performed. Specifically, a pointer is placed on the video in video display portion 91 and a left click operation is performed.

Thus, the start time or the end time is input, and a missing part of the video display period is added to video display period designation portion 93. That is, in a case where there is a missing part on the past side of the tracking period, the period from the start time to the initial video display period (tracking period) is added to the video display period. In a case where there is a missing part on the future side of the tracking period, the period from the initial video display period to the end time is added to the video display period. At this time, the additional part of the video display period is displayed in yellow.

It is possible to input the start time and the end time at video display period designation portion 93. That is, an operation for designating the corresponding time is performed within frame 65 of video display period designation portion 93. Specifically, a pointer is set at a corresponding time part within frame 65 and a left click operation is performed. Thus, the start time and the end time are input, and a missing part is added to the video display period of video display period designation portion 93.

The range of the video display period is checked at the time when the pointer is placed on the video of video display portion 91 and the left click operation is performed, and in a case where the range of the video display period is adjusted again, the editable state can be obtained by selecting the partial editing by performing a right click operation on the added yellow bar 66.

As described above, the start time and the end time can be input by an operation to select videos at the start time and the end time displayed in video display portion 91 or an operation to designate the start time and the end time in video display period designation portion 93, but if necessary for the purpose such as fine adjustment of the time, furthermore, as in the example shown in FIG. 14, the start time and end time of the video display period may be adjusted by a drag operation.

As described above, in the present exemplary embodiment, as in the above, it is possible to perform various editing operations such as the adjustment of the start time and end time of the video display period by a drag operation (deletion of an unnecessary part and addition of a missing part), the addition of the tracking period by selecting a person frame to the video display period, and the designation of the start time and end time of the video display period by selecting a video, these editing operations are not limited to the exemplified method, and it is also possible to perform various editing operations in appropriate combinations according to the situation of video.

All the editing contents related to the video display period represented by bar 66 in video display period designation portion 93 can be discarded as necessary.

Specifically, "delete all" is selected from the pop-up menu displayed by performing the right click operation on bar 66 of video display period designation portion 93. In a case where a person frame is selected in video display portion 91 and the tracking period is added to the video display period, "delete all" is selected from the pop-up menu displayed by performing the right click operation on the person frame displayed in video display portion 91.

That is, in a case where the "delete all" is selected, all deletion (partial all deletion) of discarding all edited contents of the additional video display period is executed. Then, in a case of discarding all the edited contents related to the video display period, by operating the cancel button, it is possible to return to the timeline screen and edit the video display period again.

As described above, on the tracking result editing screen, an editing operation for correcting the video display period to an appropriate period can be performed. When the editing operation is performed and the confirm button 97 is operated, screen is returned to the timeline screen in the confirmation video display state (tracking target confirmation screen, see FIG. 8). On this timeline screen, video is appropriately played back in a state in which the editing result on the tracking result editing screen is reflected. That is, video is played back over the entire appearance period from when a person who is a tracking target appears in video to when that person disappears from the video.

As described above, the exemplary embodiment has been described as an example of the technique disclosed in the present application. However, the technique of the present disclosure is not limited to this, and can also be applied to exemplary embodiments in which change, substitution, addition, omission, or the like is performed. In addition, it is also possible to combine each component described in the above exemplary embodiment to provide a new exemplary embodiment.

For example, in the above exemplary embodiment, an example of a retail store such as a supermarket has been described. However, the present invention can be applied to stores of a business type other than the retail store, such as a restaurant such as a family restaurant, and can also be applied to facilities such as business places other than stores.

In the above exemplary embodiment, an example in which a person is tracked as a moving object has been described, but it is also possible to trace a moving object other than a person, for example, a vehicle such as an automobile or a bicycle.

In the above exemplary embodiment, the timeline screen in which videos from respective cameras 1 are arranged and displayed in order of imaging time is displayed as the tracking target confirmation screen and the candidate selection screen. However, instead of this timeline screen, a map screen may be displayed in which plural video display frames displaying the videos of respective cameras 1 on the map image showing the layout in the store are disposed at positions approximately corresponding to the imaging areas of cameras 1. The tracking target search screen can also be displayed on the map screen.

In the above exemplary embodiment, a rectangular person frame is displayed as a tracking mark indicating that a person is being tracked, but the tracking mark is not limited to such a form, and various forms can be adopted.

In the above exemplary embodiment, in-camera tracking information corrector 26 and inter-camera tracking information corrector 38 corrects the tracking information such that the person corresponding to the confirmation video presented by confirmation video presentor 39 based on the tracking information on the person set as the tracking target is replaced with the person corresponding to the candidate video presented by candidate video presentor 40 or the person who is designated by the monitoring person on the video, but the correction of the tracking information also includes simply deleting erroneous tracking information. In other words, in a case where there is an error in the confirmation video but an appropriate video cannot be found in place of the confirmation video, a person corresponding to the confirmation video with an error is deleted from the tracking information.

In the above exemplary embodiment, as shown in FIGS. 1 and 3, an example has been described in which in-camera tracking processing device 4 performs the in-camera tracking process, and PC 3 performs the inter-camera tracking process and a tracking assistance process, but it is also possible to make PC 3 perform the in-camera tracking process. An in-camera tracking processor can be provided in camera 1. All or part of inter-camera tracking processor 22 can be configured with a tracking processing device different from PC 3.

In the above exemplary embodiment, as shown in FIG. 2, the cameras 1 are box-type cameras whose viewing angle is limited. However, the present invention is not limited to this, but an omnidirectional camera capable of imaging a wide range can also be used.

In the present exemplary embodiment, the in-camera tracking process and the tracking assistance process are performed by the device installed in the store, but as shown in FIG. 1, these necessary processes may be performed by PC 11 provided in the head office, or cloud computer 12 constituting the cloud computing system. The necessary processes may be shared by a plurality of information processing devices, and information may be transferred between the plurality of information processing devices through a communication medium such as an IP network or a LAN, or a storage medium such as a hard disk or a memory card. In this case, the tracking assistance system is configured with the plurality of information processing devices that share necessary processes.

Particularly, in the system configuration including cloud computer 12, in addition to PCs 3 and 11 provided at the stores and head offices, necessary information may be displayed in a portable terminal such as smartphone 13 or the tablet terminal 14 which is network-connected to cloud computer 12, such that necessary information can be confirmed at any place such as a place to go outside in addition to store and head offices.

In the above exemplary embodiment, recorder 2 that accumulates the videos from camera 1 is installed in the store, but when the processes necessary for the tracking assistance are performed by PC 11 or cloud computer 12 installed in head office, the videos from camera 1 may be transmitted to the head office or the management facility of the cloud computing system, and the videos from camera 1 may be accumulated in the device installed therein.

INDUSTRIAL APPLICABILITY

The tracking assistance device, the tracking assistance system, and the tracking assistance method according to the present disclosure have an effect in which regardless of the result of in-camera tracking, an assistance process to reduce a burden on a monitoring person is appropriately performed, which makes it possible to follow a tracking work smoothly, without losing the sight of the person being tracked, and are useful as a tracking assistance device, a tracking assistance system, and a tracking assistance method, which each displays on a display device, a video from each of a plurality of cameras which is accumulated in video accumulation means and assists a monitoring person's work of tracking a moving object which is a tracking target.

REFERENCE MARKS IN THE DRAWINGS

1 CAMERA
2 RECORDER (VIDEO ACCUMULATION MEANS)
3 PC (TRACKING ASSISTANCE DEVICE)
4 IN-CAMERA TRACKING PROCESSING DEVICE
6 INPUT DEVICE
7 MONITOR
11 PC
12 CLOUD COMPUTER
13 SMARTPHONE
14 TABLET TERMINAL
21 TRACKING INFORMATION ACCUMULATION UNIT
22 INTER-CAMERA TRACKING PROCESSOR
23 INPUT INFORMATION ACQUISITION UNIT
24 TRACKING TARGET PROCESSOR
25 VIDEO PRESENTOR
26 IN-CAMERA TRACKING INFORMATION CORRECTOR
27 VIDEO PLAYBACK DEVICE
28 SCREEN GENERATOR
31 SEARCH CONDITION SETTER
32 TRACKING TARGET SETTER
33 VIDEO DISPLAY PERIOD SETTER
34 ADDITIONAL TRACKING TARGET SETTER
35 LINK SCORE CALCULATOR
36 INITIAL TRACKING INFORMATION GENERATOR
37 CANDIDATE SELECTOR
38 INTER-CAMERA TRACKING INFORMATION CORRECTOR
39 CONFIRMATION VIDEO PRESENTOR
40 CANDIDATE VIDEO PRESENTOR
46 VIDEO DISPLAY PERIOD DESIGNATION PORTION
93 VIDEO DISPLAY PERIOD DESIGNATION PORTION
66 BAR (MOVEABLE OPERATION PORTION)

The invention claimed is:

1. A tracking assistance device that displays on a display device, a video from each of a plurality of cameras which is accumulated in a recorder and assists a monitoring person's work of tracking a moving object which is a tracking target, the tracking assistance device comprising:
 a processor;
 a memory including a program that, when executed by the processor, causes the processor to perform operations, the operations including:
  setting a search condition for finding a video of the moving object which is a tracking target, in response to a first operation input;
  acquiring a video conforming to the search condition from the recorder to display a tracking target search screen on the display device, and in response to a second operation input of designating the moving object which is the tracking target, by an operation of selecting a tracking mark displayed on the video on the tracking target search screen, setting the designated moving object as the tracking target;

extracting, for each of the plurality of cameras, a video of a moving object having a highest possibility of being the moving object set as the tracking target, based on tracking information acquired in a tracking process executed on videos accumulated in the recorder, and displaying on the display device, a tracking target confirmation screen in which only the extracted videos are displayed as confirmation videos;

in a case where the tracking mark is not displayed on the moving object which is the tracking target on the tracking target search screen, setting a video display period during which the moving object which is set as the tracking target appears in the video, in response to a third operation input; and correcting the tracking information so as to display the confirmation videos on the tracking target confirmation screen based on the video display period; and a video playback device that displays on the display device, a continuous playback screen in which the moving object set as the tracking target and a video from each of the cameras related to the moving object associated as same as the moving object are arranged and displayed in order of imaging time, and performs continuous playback in which the video from each camera is sequentially displayed as a moving image with a lapse of time, on the continuous playback screen.

2. The tracking assistance device of claim 1, wherein the processor displays on the tracking target search screen, a moveable operation portion in which a start time and an end time of the video display period are displayed respectively, and allows for an operation to adjust a range of the video display period by shifting the moveable operation portion.

3. The tracking assistance device of claim 1, wherein the processor displays on the tracking target search screen, the video from the camera in such a manner that the display time thereof can be adjusted, and acquires a start time and an end time of the video display period by allowing for an operation to select a video in which the moving object which is the tracking target appears first and a video immediately before the moving object which is the tracking target disappears.

4. A tracking assistance device that displays on a display device, a video from each of a plurality of cameras which is accumulated in a recorder and assists a monitoring person's work of tracking a moving object which is a tracking target, the tracking assistance device comprising:

a processor; and a memory including a program that, when executed by the processor, causes the processor to perform operations, the operations including:

extracting, for each of the plurality of cameras, a confirmation video of a moving object having a highest possibility of being the moving object set as the tracking target, based on tracking information acquired in a tracking process executed on videos accumulated in the recorder, and displaying on the display device, a tracking target confirmation screen in which only the extracted videos are displayed as confirmation videos;

displaying a tracking result editing screen on the display device in a case where there is excess or deficiency in the confirmation video for each camera displayed on the tracking target confirmation screen, and setting a video display period during which the moving object set as the tracking target appears in a video, in response to an operation input on the tracking result editing screen; and correcting the tracking information so as to display the confirmation videos on the tracking target confirmation screen based on the video display period, wherein the processor sets the video display period to include a tracking period of a selected moving object by allowing for an operation to select a tracking mark of the moving object which is the tracking target appearing in the video, on the tracking result editing screen.

5. The tracking assistance device of claim 4, wherein the processor displays the tracking period acquired in an in-camera tracking process for the confirmation video for each camera as an initial video display period on the tracking result editing screen, and allows for an operation to adjust a range of the video display period on the tracking result editing screen such that the initial video display period is partly deleted or added.

6. The tracking assistance device of claim 4, wherein the processor displays on the tracking result editing screen, a moveable operation portion in which a start time and an end time of the video display period are displayed respectively, and allows for an operation to adjust a range of the video display period by shifting the moveable operation portion.

7. A tracking assistance device that displays on a display device, a video from each of a plurality of cameras which is accumulated in a recorder and assists a monitoring person's work of tracking a moving object which is a tracking target, the tracking assistance device comprising:

a processor; and a memory including a program that, when executed by the processor, causes the processor to perform operations, the operations including:

extracting, for each of the plurality of cameras, a confirmation video of a moving object having a highest possibility of being the moving object set as the tracking target, based on tracking information acquired in a tracking process executed on videos accumulated in the recorder, and displaying on the display device, a tracking target confirmation screen in which only the extracted videos are displayed as confirmation videos;

displaying a tracking result editing screen on the display device in a case where there is excess or deficiency in the confirmation video for each camera displayed on the tracking target confirmation screen, and setting a video display period during which the moving object set as the tracking target appears in a video, in response to an operation input on the tracking result editing screen; and correcting the tracking information so as to display the confirmation videos on the tracking target confirmation screen based on the video display period, wherein the processor displays on the tracking result editing screen, the confirmation video for each camera in such a manner that the display time thereof can be adjusted, and acquires at least one of a start time or an end time of the video display period by allowing for an operation to select at least one of a video in which the moving object which is the tracking target appears first or a video immediately before the moving object which is the tracking target disappears.

8. A tracking assistance system that displays on a display device, a video from each of a plurality of cameras which is accumulated in a recorder and assists a monitoring person's work of tracking a moving object which is a tracking target, the tracking assistance system comprising:
 a camera that captures an image of a monitoring area;
 the display device that displays the video from each of the plurality of cameras; and
 a plurality of information processing devices,
 wherein one of the plurality of information processing devices includes a processor that:
  sets a search condition for finding a video of the moving object which is a tracking target, in response to a first operation input;
  acquires a video conforming to the search condition from the recorder to display a tracking target search screen on the display device, and in response to a second operation input of designating the moving object which is the tracking target, by an operation of selecting a tracking mark displayed on the video on the tracking target search screen, sets the designated moving object as the tracking target;
  extracts for each of the plurality of cameras, a video of a moving object having a highest possibility of being the moving object set as the tracking target, based on tracking information acquired in a tracking process executed on videos accumulated in the recorder, and displays on the display device, a tracking target confirmation screen in which only the extracted videos are displayed as confirmation videos;
  in a case where the tracking mark is not displayed on the moving object which is the tracking target on the tracking target search screen, sets a video display period during which the moving object which is set as the tracking target appears in the video, in response to a third operation input; and
  corrects the tracking information so as to display the confirmation videos on the tracking target confirmation screen based on the video display period, and
 wherein the tracking assistance system further comprises a video playback device that displays on the display device, a continuous playback screen in which the moving object set as the tracking target and a video from each of the cameras related to the moving object associated as same as the moving object are arranged and displayed in order of imaging time, and performs continuous playback in which the video from each camera is sequentially displayed as a moving image with a lapse of time, on the continuous playback screen.

9. A tracking assistance system that displays on a display device, a video from each of a plurality of cameras which is accumulated in a recorder and assists a monitoring person's work of tracking a moving object which is a tracking target, the tracking assistance system comprising:
 a camera that captures an image of a monitoring area;
 the display device that displays a video from each of the plurality of cameras; and
 a plurality of information processing devices,
 wherein one of the plurality of information processing devices includes a processor that:
  extracts, for each of the plurality of cameras, a confirmation video of a moving object having a highest possibility of being the moving object set as the tracking target, based on tracking information acquired in a tracking process executed on videos accumulated in the recorder, and displays, on the display device, a tracking target confirmation screen in which only the extracted videos are displayed as confirmation videos;
  displays a tracking result editing screen on the display device in a case where there is excess or deficiency in the confirmation video for each camera displayed on the tracking target confirmation screen, and sets a video display period during which the moving object set as the tracking target appears in a video, in response to an operation input on the tracking result editing screen; and
  corrects the tracking information so as to display the confirmation videos on the tracking target confirmation screen based on the video display period, and
 wherein the processor sets the video display period to include a tracking period of a selected moving object by allowing for an operation to select a tracking mark of the moving object which is the tracking target appearing in the video, on the tracking result editing screen.

10. A tracking assistance method, by an information processing device, of displaying on a display device, a video from each of a plurality of cameras which is accumulated in a recorder and assisting a monitoring person's work of tracking a moving object which is a tracking target, the tracking assistance method comprising:
 setting a search condition for finding a video of the moving object which is the tracking target, in response to a first operation input;
 acquiring a video conforming to the search condition from the recorder to display a tracking target search screen on the display device, and in response to a second operation input of designating the moving object which is the tracking target, by an operation of selecting a tracking mark displayed on the video on the tracking target search screen, setting the designated moving object as the tracking target;
 extracting, for each of the plurality of cameras, a video of a moving object having a highest possibility of being the moving object set as the tracking target, based on tracking information acquired in a tracking process executed on videos accumulated in the recorder, and displaying a tracking target confirmation screen in which only the extracted videos are displayed as confirmation videos, on the display device;
 setting a video display period during which the moving object which is set as the tracking target appears in the video, in response to a third operation input, in a case where the tracking mark is not displayed on the moving object which is the tracking target on the tracking target search screen;
 correcting the tracking information so as to display the confirmation videos on the tracking target confirmation screen based on the video display period; and
 displaying, by a video playback device on the display device, a continuous playback screen in which the moving object set as the tracking target and a video from each of the cameras related to the moving object associated as same as the moving object are arranged and displayed in order of imaging time, and performs continuous playback in which the video from each camera is sequentially displayed as a moving image with a lapse of time, on the continuous playback screen.

11. A tracking assistance method, by an information processing device, of displaying on a display device, a video from each of a plurality of cameras which is accumulated in a recorder and assisting a monitoring person's work of tracking a moving object which is a tracking target, the tracking assistance method comprising:

extracting, for each of the plurality of cameras, a confirmation video of a moving object having a highest possibility of being the moving object set as the tracking target, based on tracking information acquired in a tracking process executed on videos accumulated in the recorder, and displaying a tracking target confirmation screen in which only the extracted videos are displayed as confirmation videos, on the display device;

displaying a tracking result editing screen on the display device in a case where there is excess or deficiency in the confirmation video for each camera displayed on the tracking target confirmation screen, and setting a video display period during which the moving object set as the tracking target appears in a video, in response to an operation input on the tracking result editing screen;

correcting the tracking information so as to display the confirmation videos on the tracking target confirmation screen based on the video display period; and setting the video display period to include a tracking period of a selected moving object by allowing for an operation to select a tracking mark of the moving object which is the tracking target appearing in the video, on the tracking result editing screen.

* * * * *